United States Patent
Inatomi et al.

(10) Patent No.: US 9,553,719 B2
(45) Date of Patent: Jan. 24, 2017

(54) TRANSMITTING TERMINAL, RECEIVING TERMINAL, ID NUMBERING DEVICE, AND KEY TRANSMISSION METHOD

(75) Inventors: Yasuaki Inatomi, Kanagawa (JP); Hayashi Ito, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 13/816,373

(22) PCT Filed: Apr. 13, 2012

(86) PCT No.: PCT/JP2012/002564
§ 371 (c)(1),
(2), (4) Date: Feb. 11, 2013

(87) PCT Pub. No.: WO2012/144173
PCT Pub. Date: Oct. 26, 2012

(65) Prior Publication Data
US 2013/0173905 A1 Jul. 4, 2013

(30) Foreign Application Priority Data
Apr. 20, 2011 (JP) ................. 2011-093984

(51) Int. Cl.
*H04L 29/06* (2006.01)
*H04L 9/08* (2006.01)
*H04L 9/06* (2006.01)

(52) U.S. Cl.
CPC .............. *H04L 9/08* (2013.01); *H04L 9/0662* (2013.01); *H04L 9/0833* (2013.01); *H04L 2209/046* (2013.01); *H04L 2209/805* (2013.01)

(58) Field of Classification Search
CPC .................................................... H04L 9/0866
See application file for complete search history.

(56) References Cited

U.S. PATENT DOCUMENTS 5,371,794 A * 12/1994 Diffie .................... H04L 9/0844
380/273
2002/0094088 A1* 7/2002 Okaue .............. G11B 20/00086
380/278
(Continued)

FOREIGN PATENT DOCUMENTS

CN           1640031 A      7/2005
JP        2005-515696 A     5/2005
(Continued)

OTHER PUBLICATIONS

Hamming code. (Sep. 3, 2014). In Wikipedia, the Free Encyclopedia. Retrieved 18:47, Oct. 1, 2014, fromhttp://en.wikipedia.org/w/index.php?title=Hamming_code&oldid=398861063.*
(Continued)

*Primary Examiner* — Yin-Chen Shaw
*Assistant Examiner* — Michael Guirguis
(74) *Attorney, Agent, or Firm* — Pearne & Gordon LLP

(57) ABSTRACT

Provided is a transmitting terminal capable of sharing an encryption key among a number of specific apparatuses using fewer resources and securely. A transmitting terminal (400) has an inquiry ID generation unit (420) which embeds an encryption key in logical results of an XOR between an ID of a receiving terminal and random blocks according to predetermined key embedding rules in order to generate an inquiry ID. The key embedding rules are stipulations for inverting the values of bit positions corresponding to each bit value of the encryption key, in the block position correspondence relationships between the bit positions of the encryption key and the positions of the blocks into which the logical result of the XOR have been partitioned and the bit position correspondence relationships between the bit values of the encryption key and the bit positions within the blocks, which have been predefined.

13 Claims, 21 Drawing Sheets

(56) References Cited

U.S. PATENT DOCUMENTS

| | | | |
|---|---|---|---|
| 2003/0152041 A1 | 8/2003 | Herrmann et al. | |
| 2003/0159049 A1* | 8/2003 | Bennett | G06F 21/10 713/182 |
| 2004/0054891 A1* | 3/2004 | Hengeveld | H04L 9/0822 713/163 |
| 2004/0083363 A1* | 4/2004 | Hengeveld | H04L 9/0833 713/163 |
| 2005/0206530 A1* | 9/2005 | Cumming | G01D 4/006 340/870.02 |
| 2010/0281336 A1* | 11/2010 | Seurin | H04L 9/06 714/755 |

FOREIGN PATENT DOCUMENTS

| | | |
|---|---|---|
| JP | 2007-201522 A | 8/2007 |
| JP | 2008-124884 A | 5/2008 |
| JP | 2010-183215 A | 8/2010 |

OTHER PUBLICATIONS

Peng, Xiao-Hong. "Error performance evaluation for CRC coding schemes in downlink signalling of HSDPA." 3G Mobile Communication Technologies, 2004. 3G 2004. Fifth IEE International Conference on. IET, 2004.*

Gkantsidis, Christos, and Pablo Rodriguez. "Cooperative Security for Network Coding File Distribution." INFOCOM. vol. 3. 2006.*

Zhou, Zhibin, and Dijiang Huang. "An optimal key distribution scheme for secure multicast group communication." INFOCOM, 2010 Proceedings IEEE. IEEE, 2010.*

International Search Report for PCT/JP2012/002564 cited May 29, 2012.

* cited by examiner

621 ~ GROUP ID : 010 111 110
622 ~ MASK VALUE BLOCK PAIR : {000, 111}
623 ~ RANDOM BLOCK : 000 111 000
624 ~ RESULT OF LOGICAL XOR OPERATION : 010 000 110
625 ~ ENCRYPTION KEY : 1 1 0
626 ~ INVERTED BITS : FIRST BIT, FIRST BIT, SECOND BIT
627 ~ INQUIRY ID : 110 100 100

| | | | | |
|---|---|---|---|---|
| 631~ INQUIRY ID | : | 110 | 100 | 100 |
| 632~ TERMINAL ID | : | 101 | 000 | 001 |
| 633~ RESULT OF LOGICAL XOR OPERATION : | | 011 | 100 | 101 |
| 634~ DESTINATION VALUE BLOCK GROUP | : | {100, 010, 011, 101} | | |
| 635~ MASK VALUE BLOCK PAIR | : | {000, 111} | | |
| 636~ INVERTED BITS | : | FIRST BIT, FIRST BIT, SECOND BIT | | |
| 637~ ENCRYPTION KEY | : | 1 | 1 | 0 |

US 9,553,719 B2

TRANSMITTING TERMINAL, RECEIVING TERMINAL, ID NUMBERING DEVICE, AND KEY TRANSMISSION METHOD

TECHNICAL FIELD

The present invention relates to a transmitting terminal, a receiving terminal, an ID assigning apparatus and a key transmitting method in a system where a specific large number of apparatuses communicate using encryption keys shared among them.

BACKGROUND ART

There are numerous network systems, each including a specific large number of terminals and an apparatus that communicates with them. One such example is a sensor network with a huge number of sensors and an apparatus collecting data therefrom.

Such network systems generally have two requirements; first, they must provide secure communications; and second, there must be a lightweight encryption key sharing scheme and/or encryption scheme for the secure communications.

For example, the technology described in Patent Literature 1 (hereinafter called "conventional technology") is available. In the conventional technology, a bit sequence representing a terminal ID is divided into multiple blocks of a given bit size and then an encryption key fragment is assigned to each of all the values that can be represented by each block on a one-to-one basis. The correspondence relationship between the value that can be represented by each block and the corresponding encryption key fragment is pre-shared among terminals that share the encryption keys. Each terminal restores the encryption key from the terminal ID for an encryption process. In other words, the conventional technology retains the relationship between terminal identification and encryption keys in a hierarchical structure. This allows a specific large number of apparatuses to share encryption keys only by specifying terminal IDs, without transmission or reception of encryption keys.

CITATION LIST

Patent Literature

PTL 1
Japanese Patent Application Laid-Open No. 2008-124884

SUMMARY OF INVENTION

Technical Problem

Unfortunately, the conventional technology has a disadvantage in that leak of even one set of a terminal ID and its corresponding encryption key from any one of the multiple receiving terminals facilitates the presumption of encryption keys of other receiving terminals. This is because of the one-to-one relationship between divided IDs and encryption key fragments, and the fixedness of the relationship between the terminal ID and the corresponding encryption key. This indicates that the conventional technology precludes sharing encryption keys in a lightweight and secure manner with a limited resource in a system where a specific large number of apparatuses communicate using encryption keys shared among them.

Accordingly, it is an object of the present invention to provide a transmitting terminal, a receiving terminal, an ID assigning apparatus and a key transmitting method that allows encryption keys to be shared securely with a limited resource in a system where a specific large number of apparatuses communicate using encryption keys shared among them.

Solution to Problem

A transmitting terminal in accordance with the present invention is a terminal transmitting an encryption key, including a random block generating section that generates a random block by randomly selecting and concatenating mask value blocks, an inquiry ID generating section that generate a bit sequence as an inquiry ID, the bit sequence being obtained by embedding the encryption key in a result obtained by XORing an ID of a receiving terminal with which the encryption key is to be shared and the random block in accordance with a predetermined key embedding rule, and a transmitting section that transmits the inquiry ID to multiple apparatuses including the receiving terminal, wherein the predetermined key embedding rule is a rule for inverting the bit values at bit positions corresponding to the values of the bits in the encryption key, the inversion being based on a block position correspondence relationship between the bit positions in the encryption key and positions of blocks into which the result of the logical XOR operation is divided, and a bit position correspondence relationship between the values of bits in the encryption key and the positions of bits in the block.

A receiving terminal according to the present invention is a terminal receiving an encryption key, including a terminal ID retaining section that retains a terminal ID assigned to the receiving terminal, a receiving section that receives information containing the receiving terminal as a destination, an inquiry ID analyzing section that receives the inquiry ID from the transmitting terminal mentioned above via the receiving section, and an encryption key extracting section that extracts the encryption key from the result obtained by XORing the inquiry ID and the terminal ID in accordance with a predetermined key extraction rule, wherein the terminal ID is a bit sequence XORing of which with the group ID of the receiving terminal's affiliated group results in a concatenation of only mask value blocks, and the predetermined key extraction rule is a rule for extracting a bit sequence obtained, as an original encryption key when the block position correspondence relationship and the bit position correspondence relationship is applied to the result obtained by XORing the inquiry ID and the terminal ID, as the encryption key. The ID from which the inquiry ID is generated is the group ID, which is a bit sequence XORing of which with the group ID of another group does not result in concatenation of only bit-inverted blocks. The transmitting section of the transmitting terminal transmits the inquiry ID to apparatuses in the receiving terminal's affiliated group and in other groups.

An ID assigning apparatus in accordance with the present invention is an ID assigning apparatus that assigns a terminal ID to a receiving terminal that receives the inquiry ID from the transmitting terminal mentioned above, including an ID managing section that manages assigned terminal IDs, a group ID selecting section that selects a group ID in accordance with a predetermined assignment rule, a terminal ID generating section that generates a terminal ID affiliated to the group ID in accordance with the predetermined assignment rule, and an ID registering section that assigns the terminal ID to the receiving terminal so as to avoid duplication with a preliminarily assigned terminal ID, wherein the predetermined assignment rule is a rule for selecting a group ID which is a bit sequence XORing of which with the group ID of another group does not result in concatenation of only bit-inverted blocks and for generating a bit sequence XORing of which with the selected group ID results in a concatenation of only mask value blocks, as the terminal ID.

A key transmitting method in accordance with the present invention is a method for a transmitting terminal to transmit an encryption key, including the steps of generating a random block by randomly selecting and concatenating mask value blocks; generating a bit sequence as an inquiry ID, the bit sequence being obtained by embedding the encryption key in the result obtained by XORing an ID of a receiving terminal with which the encryption key is to be shared and the random block in accordance with the predetermined key embedding rule; and transmitting the inquiry ID to multiple receiving terminals including the receiving terminal, wherein the predetermined key embedding rule is a rule for inverting the bit values at bit positions corresponding to the values of the bits in the encryption key, the inversion being based on a block position correspondence relationship between the bit positions in the encryption key and positions of blocks into which the result of the logical XOR operation is divided, and a bit position correspondence relationship between the values of bits in the encryption key and the positions of bits in the block.

Advantageous Effects of Invention

According to the present invention, encryption keys can be shared securely with a limited resource in a system where a specified number of apparatuses communicate using encryption keys shared among them.

DESCRIPTION OF EMBODIMENTS

Embodiments of the present invention will be described in detailed with reference to the drawings below.

Embodiment 1 of the present invention describes encryption keys that are shared securely between transmitting terminal and receiving terminal.

Embodiment 2 of the present invention describes a transmitting terminal that collects terminal data retained by receiving terminals in each group, using shared encryption keys.

Embodiment 3 of the present invention describes a transmitting terminal that collects terminal data retained by each receiving terminal, using a shared encryption key.

Embodiment 4 of the present invention describes a transmitting terminal that has all the receiving terminals for each group generate its own group ID and terminal IDs concurrently.

Embodiment 5 of the present invention describes destination terminals that are determined based on the conditions of receiving terminals with which encryption keys are to be shared (receiving terminals to which communication data should be transmitted), such as the locations thereof.

Before describing the embodiments, terms used in each embodiment are described below:

The "given bit size" refers to a fixed size (3 bits or more) of data in which an encryption key of one bit is to be embedded.

The "bit-inverted block pair" consists of blocks of a given bit size, the bits of one block and the respective bits of the other block being inverted from each other.

The "bit-inverted block" refers to a block having a given bit size and belonging to a bit-inverted block pair.

The "concatenated bit-inverted block" refers to a block that consists of bit-inverted blocks belonging to the same bit-inverted block pair.

The "mask value block pair" refers to a bit-inverted block pair that consists of a block of bits having "0" values and a block of bits having "1" values (part of bit-inverted block pairs)

The "mask value block" refers to a block belonging to a mask value block pair.

In the description of the embodiments, the bit size has a minimum value of 3. Thus, bit-inverted block pairs include for example, {000, 111} and {011, 100} and a mask value block pair {000, 111}. The ID of each apparatus used to share encryption keys is 9 bits in length.

The "transmitting terminal" refers to a terminal transmitting an encryption key.

The "receiving terminal" refers to a terminal receiving an encryption key.

The "downlink message" refers to a message sent from a transmitting terminal to a receiving terminal.

The "uplink message" refers to a message sent from a receiving terminal to a transmitting terminal.

Embodiment 1

Embodiment 1 of the present invention describes encryption keys that are shared securely between transmitting terminal and receiving terminal.

The configuration of a communication system including a transmitting terminal, a receiving terminal and an ID assigning apparatus in accordance with this embodiment will now be described.

Figure 1:
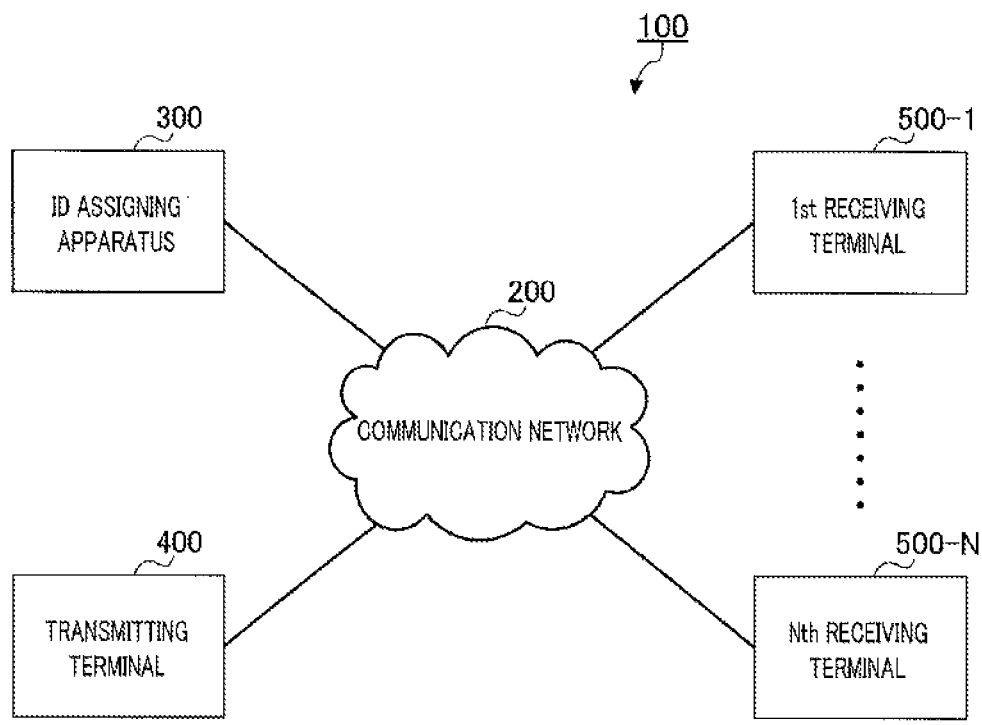
FIG. 1 is a system configuration diagram illustrating the configuration of a communication system, including a transmitting terminal, a receiving terminal and an ID assigning apparatus in accordance with Embodiment 1 of the present invention.

FIG. 1 is a system configuration diagram illustrating the configuration of a communication system, including a transmitting terminal, a receiving terminal, and an ID assigning apparatus in accordance with this embodiment of the present invention.

In FIG. 1, communication system 100 includes ID assigning apparatus 300, transmitting terminal 400 and receiving terminals 500-1 to 500-N, all of which are connected wirelessly or wired to communication network 200, such as the Internet. Since receiving terminals 500-1 to 500-N has the same configuration, they are collectively called "receiving terminals 500", as appropriate.

Communication system 100 is, for example, the above-mentioned sensor network with a numerous number of sensors and an apparatus collecting data therefrom. In this case, receiving terminals 500 are sensors having a communication function while transmitting terminal 400 is an apparatus collecting data therefrom.

ID assigning apparatus 300 assigns an ID to each of receiving terminals 500, including transmitting terminal 400, via communication network 200. ID assigning apparatus 300 assigns IDs in accordance with the predetermined assignment rule described below (hereinafter simply referred to as "assignment rule"), thereby enabling a secure sharing of encryption keys.

The ID of receiving terminal 500 is a terminal ID that identifies receiving terminal 500. As described below, the terminal ID includes information concerning a group to which receiving terminal 500 is affiliated (hereinafter referred to as "group ID"). In this embodiment, a terminal ID assigned by ID assigning apparatus 300 as the ID of receiving terminal 500 uniquely identifies the group ID of the group to which receiving terminal 500 is affiliated. Accordingly, the assignment of a terminal ID in this embodiment indicates assignment and notification of both the terminal ID and its affiliated group ID to receiving terminal 500.

Transmitting terminal 400 transmits an encryption key to each of receiving terminals 500 (hereinafter referred to as "destination terminal", as appropriate) to share an encryption key with transmitting terminal 400 via communication network 200. Transmitting terminal 400 embeds an encryption key in a bit sequence containing a destination terminal ID in accordance with the predetermined key embedding rule described below, thereby transmitting the encryption key while keeping the destination terminal ID and the encryption key secure.

ID assigning apparatus 300 and transmitting terminal 400 may use identification information, such as a network address, other than a terminal ID and a group ID, to identify each of receiving terminals 500 and communicate with the same individually.

Receiving terminal 500 receives an encryption key from transmitting terminal 400 via communication network 200. Receiving terminal 500 receives and extracts the encryption key in a secure manner, in accordance with the predetermined key embedding rule described below.

Such communication system 100 allows transmitting terminal 400 and each of receiving terminals 500 to share an encryption key securely with a limited resource.

The description of the communication system in accordance with this embodiment is now completed.

Transmitting terminal 400 and receiving terminals 500 may have the same configuration. In other words, multiple communication terminals in communication system 100 may have the configurations of transmitting terminal 400 and of receiving terminals 500. Furthermore, a communication terminal having either or both of the functions of transmitting terminal 400 and receiving terminal 500 may have the functions of ID assigning apparatus 300.

The configuration, of each apparatus will now be described. ID assigning apparatus 300, transmitting terminal 400 and receiving terminal 500 are computers having, for example, central processing section (CPU) and storage, such as random access memory (RAM). The CPU executes a control program stored in memory, thereby enabling each apparatus to operate each functional unit to achieve its functions.

Figure 2:
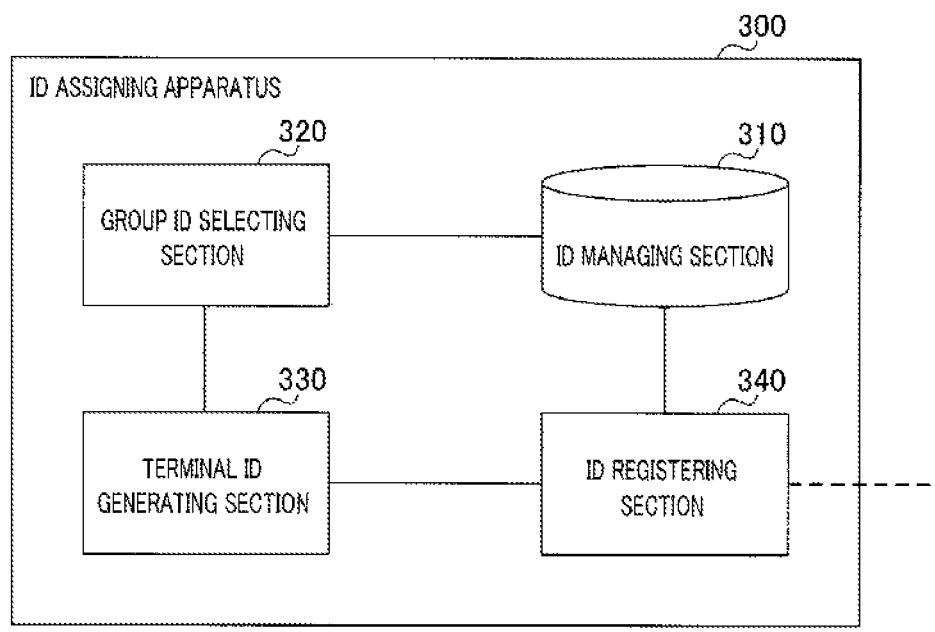
FIG. 2 is a block diagram showing the configuration of an ID assigning apparatus in accordance with Embodiment 1 of the present invention.

FIG. 2 is a block diagram showing the configuration of ID assigning apparatus 300.

In FIG. 2, ID assigning apparatus 300 includes ID managing section 310, group ID selecting section 320, terminal ID generating section 330 and ID registering section 340. ID assigning apparatus 300 also includes user interfaces (UIs, not shown), such as a liquid crystal display and key switches.

ID managing section 310 manages assigned terminal IDs (group IDs).

More specifically, ID managing section 310, for example, has a list of group IDs generated in accordance with the assignment rule, a list of terminal IDs for each group ID and a list of assigned terminal IDs. In response to inquiries from other functional units, ID managing section 310 returns necessary information, such as the list of group IDs or a reply indicating whether an inquired terminal ID can be (or has been) assigned.

Group ID selecting section 320 selects a group ID for each of receiving terminals 500 in accordance with the assignment rule.

More specifically, for example, group ID selecting section 320 provides a user with the above-mentioned list of group IDs via a user interface to have the user select an group ID. Group ID selecting section 320 passes the group ID selected by the user to terminal ID generating section 330 to instruct terminal ID generating section 330 to generate a terminal ID.

Terminal ID generating section 330 generates a terminal ID of receiving terminal 500, the terminal ID being affiliated to the group ID, in accordance with the assignment rule.

More specifically, for example, terminal ID generating section 330 generates a terminal ID which is affiliated to the received group ID in response to the instruction of group ID selecting section 320. Terminal ID generating section 330 passes the generated terminal ID to ID registering section 340 to instruct the same to check for duplication of and register the terminal ID.

ID registering section 340 assigns the terminal ID to receiving terminals 500 so as to avoid duplication with existing terminal IDs.

More specifically, for example, ID registering section 340 includes a communication interface (not shown) connected to communication network 200. In response to an instruction of ID generating section 330 or ID registering section 340, ID registering section 340 asks ID managing section 310 whether the terminal ID is available for assignment. If it is available, ID registering section 340 transmits the terminal ID to the corresponding receiving terminal 500 and registers it to ID managing section 310 as a terminal ID that has been just allocated. If the terminal is not available for registration, ID registering section 340 instructs terminal ID generating section 330 to generate another terminal ID.

ID registering section 340 may provide a user with the result of the registration via a user interface. Terminal ID generating section 330 may select and pass a terminal ID from a pool of already prepared terminal IDs, instead of generating a new ID each time it is asked to do so. In this case, terminal ID generating section 330, for example, acquires a list of terminal IDs available for assignment from ID managing section 310, and then shows it to the user for selection of a terminal ID. This eliminates the need for ID registering section 340 to ask whether a terminal ID is available for assignment.

Figure 3:
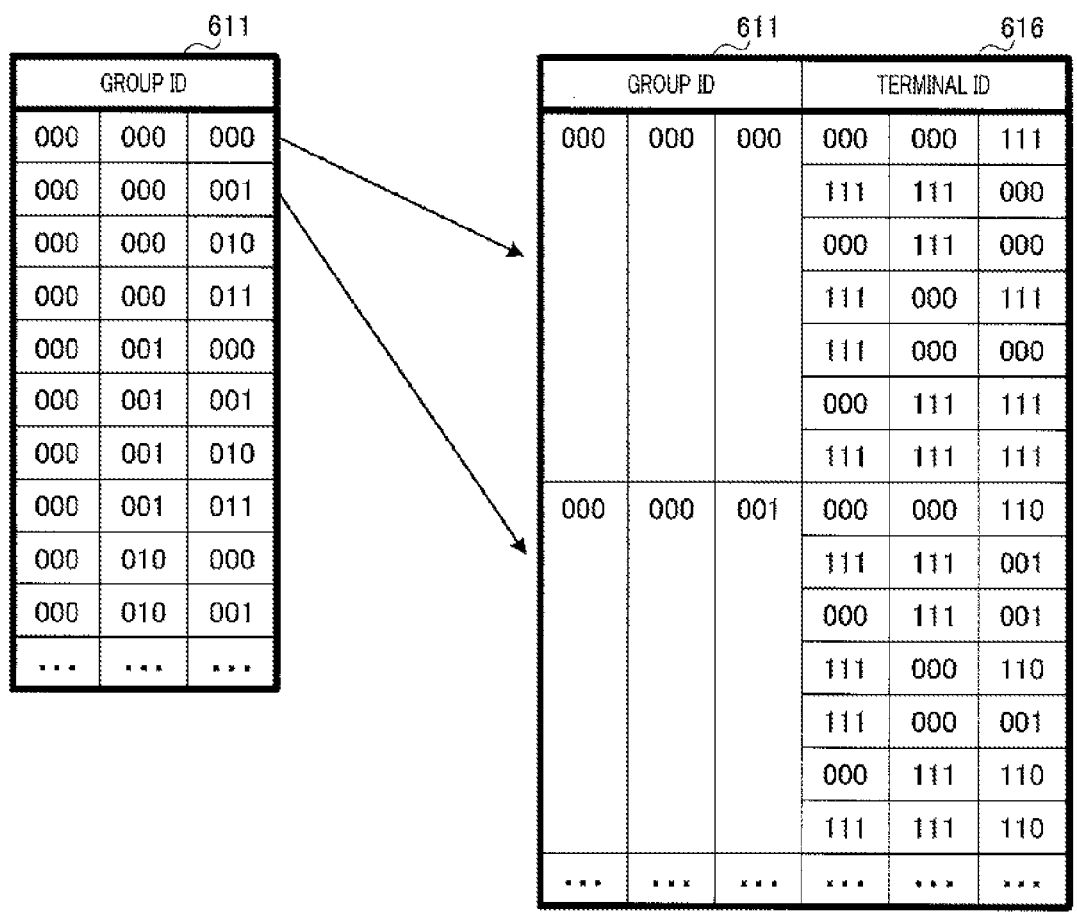
FIG. 3 describes an exemplary assignment rule in accordance with Embodiment 1 of the present invention.

FIG. 3 is an exemplary diagram to describe the above-mentioned assignment rule.

ID managing section 310 keeps, for example, group ID list 611 shown in FIG. 3. With the group IDs in group ID list 611, XORing any pair of group IDs does not result in a concatenation of only bit-inverted blocks. The bit-inverted blocks, as described above, are those in a bit-inverted block pair, the bits of one block and the respective bits of the other block being inverted from each other.

For example, as shown in FIG. 3, group ID list 611 has group IDs of "000000000" and "000000001". XORing the group IDs and dividing the resulting bit sequence into three-digit blocks results in "000 000 001" (Similarly, each bit sequence is hereinafter displayed, with the sequence divided into three-digit blocks).

As is evident from the result of the logical XOR operation of these group IDs, which has, for example, the first block of "000" and the third block of "001", the corresponding bits of these blocks are not inverted from each other. This indicates that the bit sequence is not a concatenation of only bit-inverted blocks.

Now, it is assumed that, for example, group IDs of "0000000000" and "000111000" (not shown) are assigned, without deference to the assignment rule in accordance with this embodiment. XORing these group IDs and dividing the resulting bit sequence into three-digit blocks results in "000 111 000". As is evident from the result of the logical XOR operation of these group IDs, which has the first block of "000", the second block of "111" and the third block of "000", the corresponding bits of these blocks are inverted from each other. In other words, XORing the group IDs which do not follow the assignment rule in accordance with this embodiment results in a concatenation of only bit-inverted blocks. In contrast, group IDs assigned according to the assignment rule in accordance with this embodiment does not result in a concatenation of only bit-inverted blocks.

The assignment rule stipulates that, for example, a group ID is selected from group ID list 611. In other words, the assignment rule includes a rule that selects a group ID consisting of a bit sequence XORing of which with another group ID does not result in a concatenation of only bit-inverted blocks. In addition, such assignment rule also include a rule that generates a terminal ID consisting of a bit sequence XORing of which with the selected group ID results in a concatenation of only mask value blocks.

To generate terminal IDs in accordance with the assignment rule, terminal ID generating section 330 operates as shown in FIG. 3, for example.

Terminal ID generating section 330 uses mask value block pair 613 of {000, 111} for group ID 612 of "110 100 100" to generate random block 614 of "111 000 111". Random block 614 is generated by randomly selecting and concatenating mask value blocks from the mask value block pair ("000" and "111"). Terminal ID generating section 330 XORs group ID 612 and random block 614 to generate terminal ID 615 of "001 100 011".

Since the random block is a combination of three sub-blocks, 8 patterns of bit sequence can be generated. Terminal ID generating section 330 may not assign a bit sequence that equals the group ID to which a terminal ID belongs to the terminal ID. In this case, as shown, in terminal ID list 616, seven patterns of terminal ID, excluding one pattern that equals that of the group ID, are generated for one group ID.

The group IDs thus selected and the terminal IDs thus generated meet the above-mentioned assignment rule. In other words, XORing of each terminal ID with its affiliated group ID (or with another terminal ID within the affiliated group) results in inclusion of only mask value blocks. In contrast, XORing of each terminal ID with a non-affiliated group ID (or with a terminal ID in another group) results in inclusion of blocks other than mask value blocks.

The above-mentioned ID assigning apparatus 300 can assign a terminal ID (group ID) that allows a secure sharing of encryption keys between transmitting terminal 400 and each of receiving terminals 500.

Figures 4, 5:
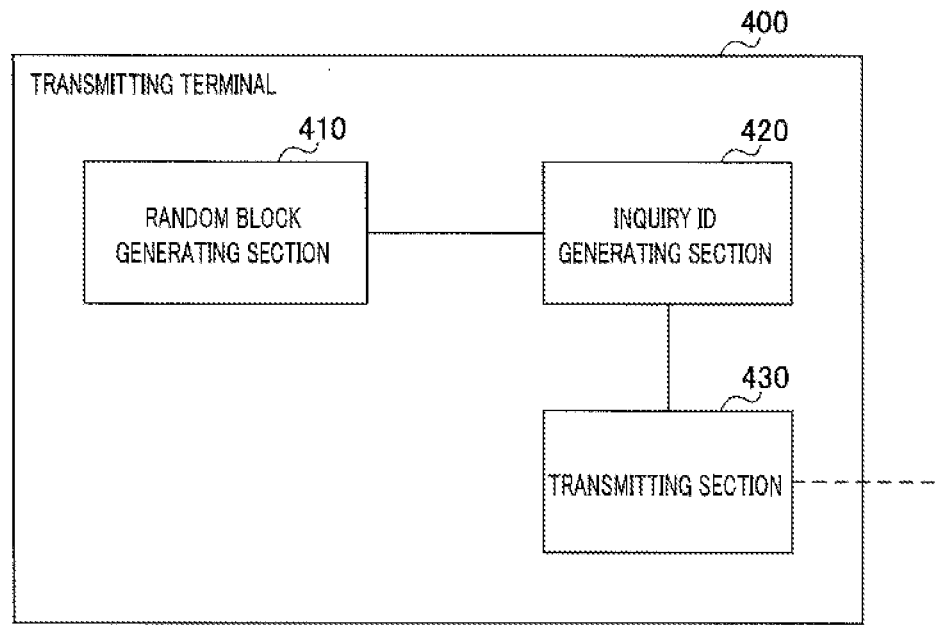
FIG. 4 is a block diagram showing the configuration of a transmitting terminal in accordance with Embodiment 1 of the present invention.
FIG. 5 describes an exemplary key embedding rule in accordance with Embodiment 1 of the present invention.

FIG. 4 is a block diagram showing the configuration of transmitting terminal 400.

In FIG. 4, transmitting terminal 400 includes random block generating section 410, inquiry ID generating section 420 and transmitting section 430.

Random block generating section 410 generates a random block by randomly selecting and concatenating mask value blocks.

More specifically, for example, random block generating section 410 generates a new random block in response to a request from inquiry ID generating section 420, and passes the generated random block to inquiry ID generating section 420.

Inquiry ID generating section 420 generates a bit sequence obtained by embedding an encryption key in the result of a logical XOR operation in accordance with the predetermined key embedding rule (hereinafter simply referred to as "key embedding rule"), as an inquiry ID, the result being obtained by XORing the ID of receiving terminal 500 (hereinafter referred, to as a "destination terminal", as applicable) to share the encryption key and a random block.

More specifically, for example, inquiry ID generating section 420 acquires an encryption key retained by itself or generated by any other functional unit (not shown). Inquiry ID generating section 420 acquires a destination terminal ID in response to user operation or an instruction from another apparatus. The bit size of the encryption key equals the number of blocks (3 for this embodiment) into which a bit sequence representing a destination terminal ID is divided by the above-mentioned given bit size. Inquiry ID generating section 420 acquires a random block from random block generating section 410. Inquiry ID generating section 420 generates the inquiry ID by embedding the encryption key in the result of the logical XOR operation in accordance with the key embedding rule, the result being obtained XORing the destination terminal ID and the random block. Inquiry ID generating section 420 passes the generated inquiry ID to transmitting section 430.

In this embodiment, inquiry ID generating section 420 uses a group ID to generate an inquiry ID. This means that transmitting terminal 400 designates all the receiving terminals 500 affiliated to a certain group as destination terminals.

Transmitting section 430 transmits a downlink message to multiple apparatuses including the destination terminal.

More specifically, for example, transmitting section 430 includes a communication interface (not shown) connecting to communication network 200. Transmitting section 430 broadcasts the inquiry ID or a downlink message with the inquiry ID added to communication network 200. The part containing the inquiry ID in the downlink message is predetermined. As described below, upon broadcasting of a downlink message with the added inquiry ID via communication network 200, receiving terminals 500 each receives the broadcast downlink message and then extracts the inquiry ID therefrom. Thus, transmitting section 430 transmits the inquiry ID to multiple apparatuses, including the destination terminal, in the above-mentioned broadcast message.

FIG. 5 is an exemplary diagram to describe the above-mentioned key embedding rule.

The key embedding rule is a predetermined rule to invert the value of each block at the bit position corresponding to the value of each bit in an encryption key. This rule is based on a block position correspondence relationship and a bit position correspondence relationship (hereinafter collectively referred to as "position correspondence relationship"). The block position correspondence relationship is a correspondence relationship between a bit position of an encryption key and a block position of the result of a logical XOR operation divided by the above-mentioned given bit size (3 for this embodiment), the result being obtained by XORing a destination terminal ID and a random block. The bit position correspondence relationship is a correspondence relationship between a bit value of the encryption key and the bit position in the corresponding block.

In this embodiment, the block position correspondence relationship is such that the order of the bits in the encryption key starting from the leftmost corresponds to the order, from the leftmost, of the divided blocks from the above mentioned result of the logical XOR operation. The bit position correspondence relationship is such that the bit value of "1" of the encryption key corresponds to the first bit in the above mentioned block, and the bit value of "0" of the encryption key corresponds to the second bit in the above mentioned block.

To generate an inquiry ID in accordance with the key embedding rule, random block generating section 410 and inquiry ID generating section 420 operates as shown in FIG. 5, for example.

It is assumed that random block generating section 410 acquires group ID 621 of "010 111 110". Random block generating section 410 uses mask value block pair 622 of {000, 111} for group ID 621 to generate random blocks 623 of "000 111 000". Inquiry ID generating section 420 XORs group ID 621 and random block 623 to obtain the result of logical XOR 624 of "010 000 110".

It is assumed that inquiry ID generating section 420 acquires encryption key 625 of "1 1 0". In such a case, inquiry ID generating section 420 inverts the first bit, the first bit, and the second bit (as shown in inverted bits 626) of the first, second and third blocks, respectively, of the result of logical XOR operation 624. If the value of the "m"th bit of an encryption key is 1, inquiry ID generating section 420 inverts the first bit in the "m"th block of the result of logical XOR operation. Similarly, if the value of the "m"th bit of an encryption key is 0, inquiry ID generating section 420 inverts the second bit in the "m"th block of the result of logical XOR operation. Thus, inquiry ID generating section 420 generates inquiry ID 627 of "110 100 100" with encryption key 625 embedded.

Such transmitting terminal 400 can transmit an encryption key to a destination terminal, while keeping the destination terminal ID and the encryption key secure.

Figures 6, 7:
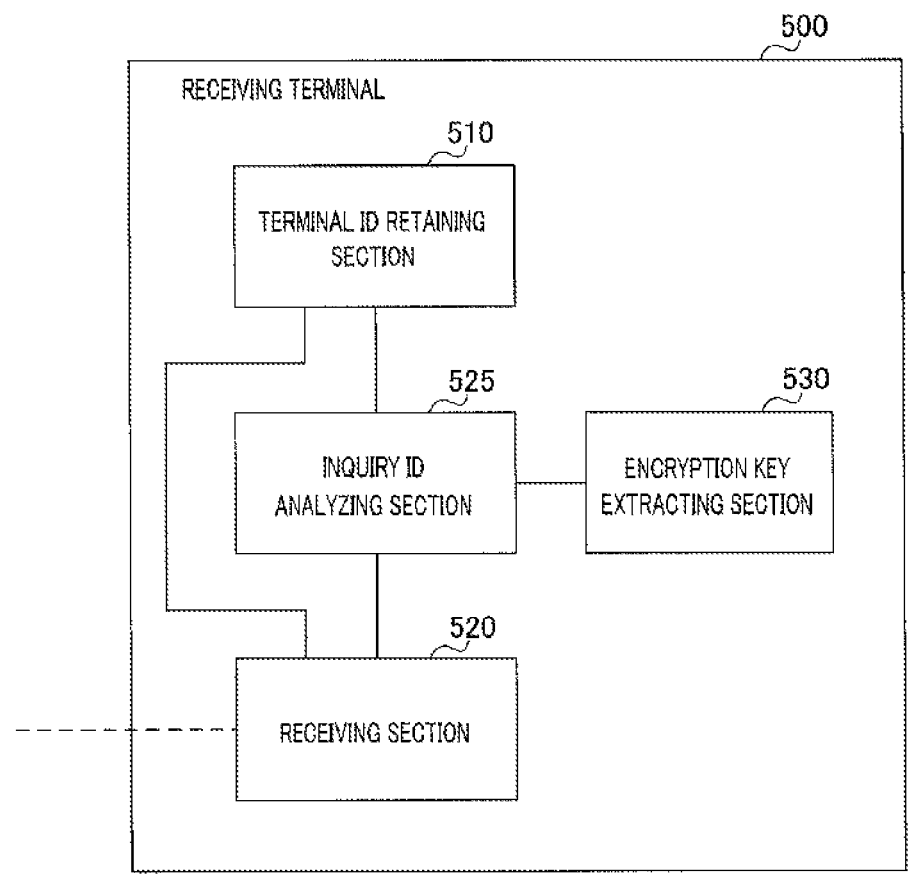
FIG. 6 is a block diagram showing the configuration of a receiving terminal in accordance with Embodiment 1 of the present invention.
FIG. 7 describes an exemplary key extraction rule in accordance with Embodiment 1 of the present invention.

FIG. 6 is a block diagram showing the configuration of receiving terminals 500.

In FIG. 6, receiving terminal 500 includes terminal ID retaining section 510, receiving section 520, inquiry ID analyzing section 525 and encryption key extracting section 530.

Terminal ID retaining section 510 retains a terminal ID (group ID) assigned to receiving terminal 500.

More specifically, for example, terminal ID retaining section 510 receives a terminal ID addressed to receiving terminal 500 from ID assigning apparatus 300 via receiving section 520 described below. In response to a request from inquiry ID analyzing section 525, terminal ID retaining section 510 passes the retained terminal ID to inquiry ID analyzing section 525.

Receiving section 520 receives information containing the receiving terminal 500 designated as a destination.

More specifically, for example, receiving section 520 includes a communication interface (not shown) connected to communication network 200. When ID assigning apparatus 300 transmits a terminal ID which is to be assigned to the receiving terminal 500, receiving section 520 receives the terminal ID and then passes it to terminal ID retaining section 510. Upon broadcasting of transmitting terminal 400 broadcasts a downlink message with an added inquiry ID to communication network 200, receiving section 520 receives and passes the downlink message to inquiry ID analyzing section 525.

Inquiry ID analyzing section 525 receives the inquiry ID from transmitting terminal 400 via receiving section 520.

More specifically, for example, inquiry ID analyzing section 525 acquires an inquiry ID from the downlink message sent by receiving section 520. Inquiry ID analyzing section 525 receives a terminal ID (group ID) from terminal ID retaining section 510 to determine whether the downlink message is addressed to the group to which the receiving terminal 500 is affiliated (hereinafter referred to as "its own group") based on the inquiry ID contained in the downlink message and the terminal ID. If the downlink message is addressed to its own group, inquiry ID analyzing section 525 passes the inquiry ID and the terminal ID to encryption key extracting section 530.

Encryption key extracting section 530 extracts an encryption key from the result obtained by XORing the inquiry ID and the terminal ID in accordance with a predetermined key extraction rule (hereinafter referred to as the "key extraction rule").

More specifically, for example, encryption key extracting section 530 passes the extracted encryption key to a functional unit (not shown) that decrypts the received communication data and/or encrypts the communication data to be transmitted to transmitting terminal 400.

FIG. 7 is an exemplary diagram to describe the above-mentioned extraction rule.

The key extraction rule is a rule for acquiring, as an encryption key, a bit sequence obtained as an original encryption key when applying the block position correspondence relationship and the bit position correspondence relationship to the result obtained by XORing an inquiry ID and the terminal ID.

To extract an encryption key in accordance with such key extraction rule, inquiry ID analyzing section 525 and encryption key extracting section 530 carry out operations as shown in FIG. 7.

It is assumed that inquiry ID analyzing section 525 extracts inquiry ID 631 of "110 100 100" to obtain terminal ID 632 of "101 000 001". Inquiry ID analyzing section 525 then XORs inquiry ID 631 and terminal ID 632 to obtain the result of logical XOR operation 633 of "011 100 101".

The result of logical XOR operation of the inquiry ID and the terminal ID is a bit sequence obtained by embedding an encryption key in the result of logical XOR operation of the affiliated group ID of the terminal ID, a random block, and the terminal ID.

Meanwhile, the result of logical XOR operation of the affiliated group ID of the terminal ID and the terminal ID contains only mask value blocks, as described above. The result of logical XOR operation of a bit sequence consisting of only mask value blocks and a random block consisting of only mask value blocks also contains only mask value blocks.

Accordingly, if a terminal ID is affiliated to the original group ID, XORing an inquiry ID and the terminal ID always results in a bit sequence consisting of only mask value blocks with an encryption key embedded.

As described above, an encryption key is embedded by inverting the first bit or second bit of each block. Accordingly, XORing an inquiry ID and a terminal ID always results in inclusion of only four blocks which are obtained by inverting the first bit or second bit of a mask value block: 100, 010, 011 and 101. These four blocks are hereinafter referred to as a "destination value block group".

The block obtained by inverting the first bit or second bit of a mask value block is hereinafter referred to as a "destination value block". The destination value blocks indicate the possible values taken by the result obtained by embedding the values of the bits of an encryption key in the mask value in accordance the above-mentioned bit position correspondence relationship.

Accordingly, as shown in FIG. 7, inquiry ID analyzing section 525 determines whether the results of logical XOR operation 633 of inquiry ID 631 and terminal ID 632 consists of only members of destination value block group 634 of {100, 010, 011, 101}. Inquiry ID analyzing section 525 determines whether the inquiry ID is addressed to its own group based on the aforementioned judgment.

In the example shown in FIG. 7, the result of logical XOR operation 633 consists of only members of destination value block group 634 of {100, 010, 011, 101}. Thus, inquiry ID analyzing section 525 passes inquiry ID 631 and terminal ID 632 to encryption key extracting section 530.

Encryption key extracting section 530 checks the position of an inverted bit for each block in the result of logical XOR operation 633, and determines that inverted bits 636 are the first bit in the first block, the first bit in the second block and the second bit in the third block. Encryption key extracting section 530 extracts encryption key 637 of "1 1 0" based on the above-mentioned position correspondence relationship. Encryption key 637 is the same as encryption, key 625 embedded in the inquiry ID shown in FIG. 5.

As described above, if a terminal ID is not affiliated to the original group ID, the result of logical XOR operation of the group ID and the terminal ID always contain blocks other than mask value blocks. In other words, the result of logical XOR operation of the inquiry ID from which an encryption key is extracted and a terminal ID contains blocks other than destination value blocks. In addition, the result of logical XOR operation of an inquiry ID and the terminal ID may accidentally contain a block that coincides with a destination value block. This means that apparatuses other than a destination terminal cannot determine which bit in each block has been inverted, and thus cannot extract an encryption key embedded in the inquiry ID successfully.

In addition, the inquiry ID varies, depending on a random block, even if the same destination terminal and encryption key are used. This precludes identification of the group ID and terminal ID of the destination terminal associated with an individual inquiry ID.

Accordingly, it is extremely difficult for a third party to directly extract an encryption key from an inquiry ID or presume an encryption key from an inquiry ID based on the group ID and terminal ID.

Such receiving terminals 500 can receive an inquiry ID addressed to its own group from transmitting terminal 400 and then successfully extract an encryption key from the received inquiry ID.

The description of the apparatus configuration is now completed.

The operations of each apparatus will now be described.

Figure 8:
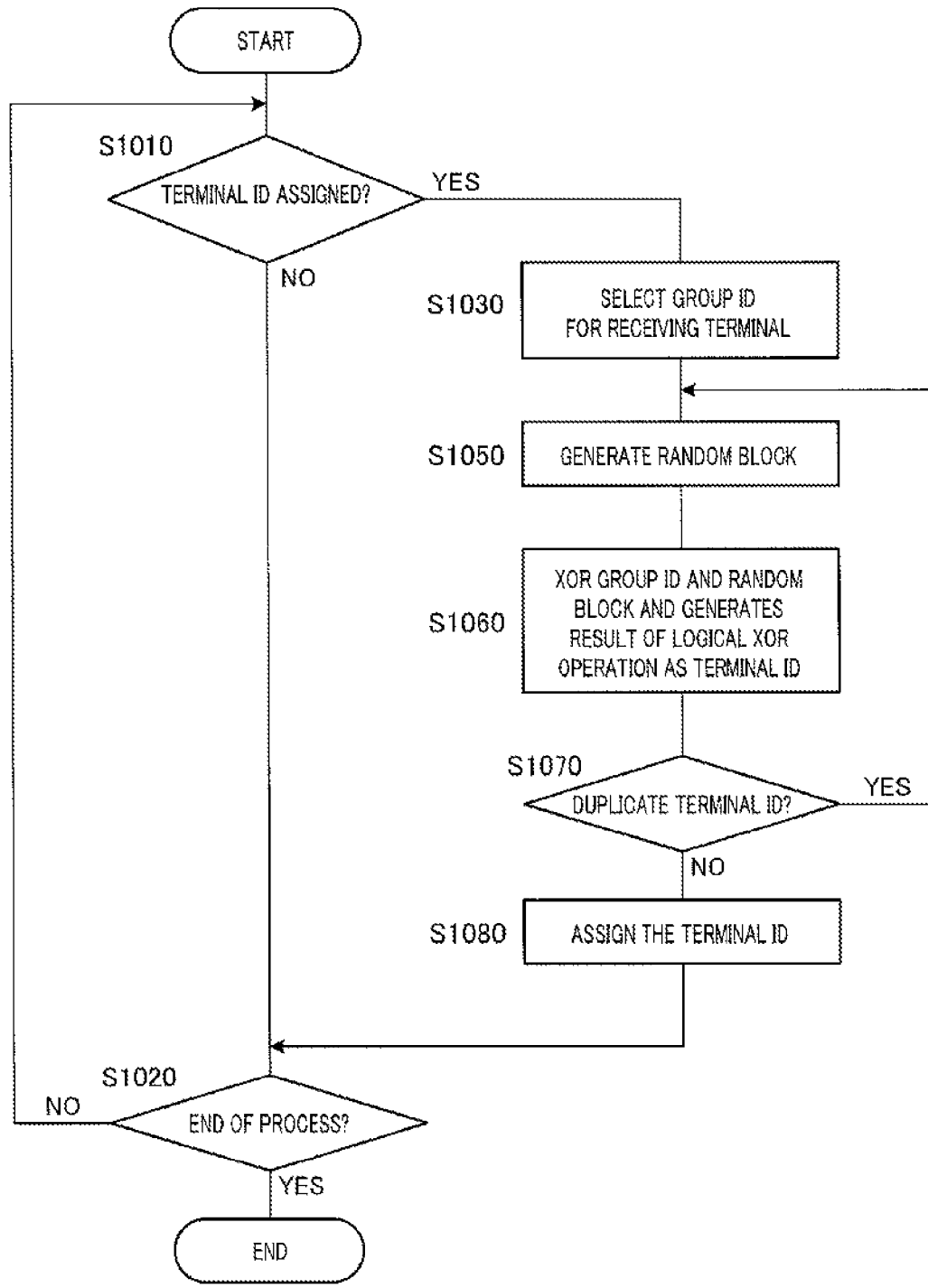
FIG. 8 is a flow chart illustrating an exemplary operation of the ID assigning apparatus in accordance with Embodiment 1 of the present invention.

FIG. 8 is a flow chart illustrating an exemplary operation of ID assigning apparatus 300.

At Step S1010, group ID selecting section 320 determines the necessity of assignment of a terminal ID. Such assignment is necessary, for example, when a user instructs the assignment via user interface, when receiving terminals 500 requests it, or when a new connection from receiving terminal 500 to communication network 200 is detected. If the assignment of a terminal ID is not necessary (S1010: NO), group ID selecting section 320 performs Step S1020; otherwise (S1010: YES), it performs Step S1030.

At Step S1030, group ID selecting section 320 selects a group ID for receiving terminal 500 to which a terminal ID is assigned.

At Step S1050, terminal ID generating section 330 generates a random block using a mask value block.

At Step S1060, terminal ID generating section 330 generates the result of logical XOR operation of the group ID and the random block, as a terminal ID.

At Step S1070, ID registering section 340 asks ID managing section 310 whether the generated terminal ID has a duplicate terminal ID already registered. If a duplicate terminal ID is registered (S1070: YES), ID registering section 340 performs Step S1050 again to allow terminal ID generating section 330 to generate another terminal ID. If no duplicate terminal ID is registered (S1070: NO), ID registering section 340 performs Step S1080.

At Step S1080, ID registering section 340 transmits the terminal ID to receiving terminal 500 to which it is assigned, while registering it to ID managing section 310, thereby assigning the terminal ID to receiving terminal 500.

At Step S1020, group ID selecting section 320 determines whether the end of processing is instructed through user operation via a user interface. If the end of processing is not instructed (S1020: NO), group ID selecting section 320 performs Step S1010 again; otherwise (S1020: YES), group ID selecting section 320 terminates the processing.

The above-mentioned process flow allows ID assigning apparatus 300 to assign a terminal ID that enables a secure sharing of an encryption key to each of receiving terminals 500.

ID registering section 340 may receive a reply, from receiving terminal 500 to which an assigned terminal ID was sent, indicating whether it accepts the assigned ID, and register the terminal ID only when it is accepted by receiving terminal 500. ID registering section 340 may inform the user of a successful or failed registration through user interface, or if the terminal ID is rejected by the user, may perform Step S1050 again to generate another terminal ID.

Figure 9:
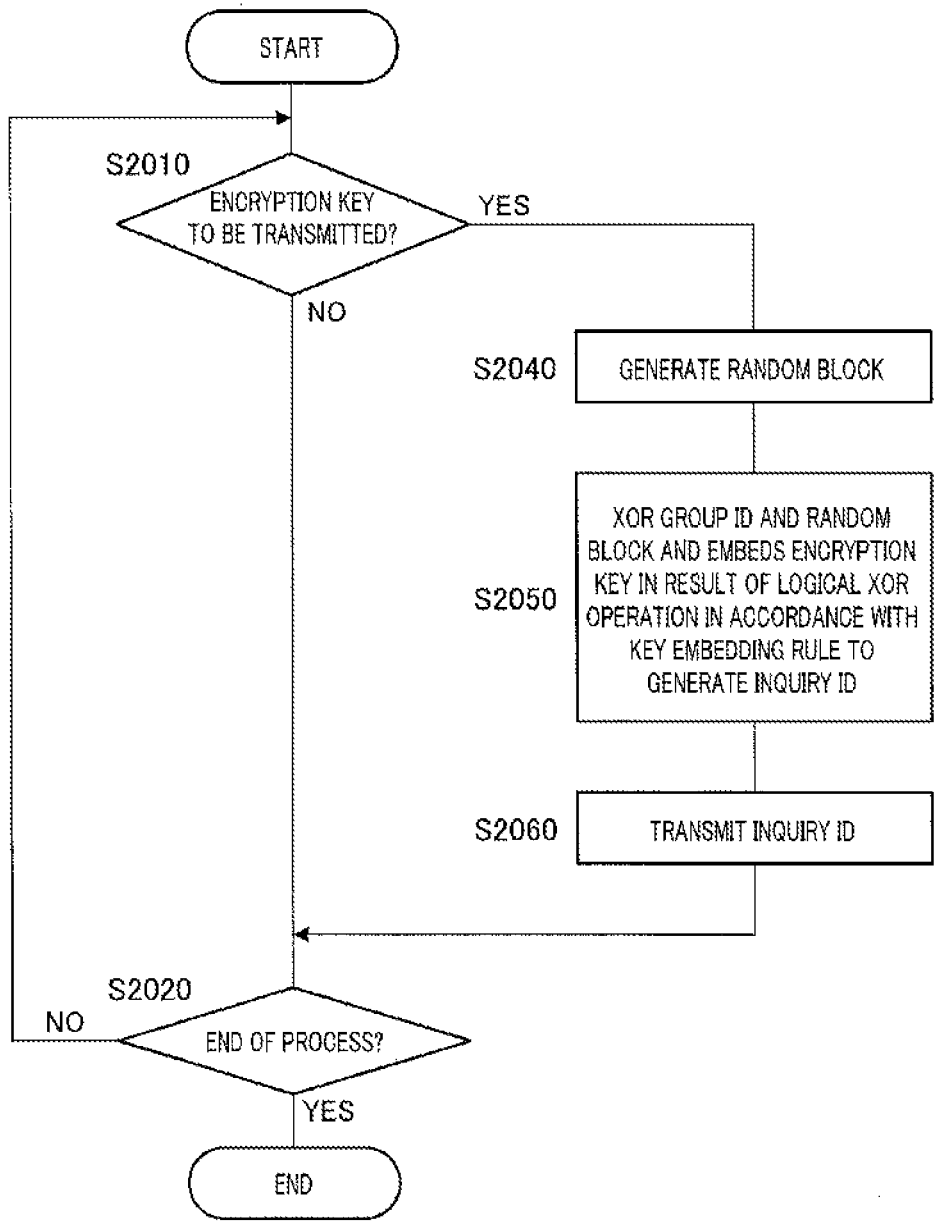
FIG. 9 is a flow chart illustrating an exemplary operation of the transmitting terminal in accordance with Embodiment 1 of the present invention.

FIG. 9 is a flow chart illustrating an exemplary operation of transmitting terminal 400.

At Step S2010, inquiry ID generating section 420 determines the necessity of transmission of an encryption key. Such transmission is necessary, for example, when inquiry ID generating section 420 receives a group ID and communication data from a communication control apparatus (not shown) and is instructed to transmit the communication data, or when a new group to which communication data is transmitted has been formed. If such transmission is not necessary (S2010: NO), inquiry ID generating section 420 performs Step S2020; otherwise (S2010: Yes), inquiry ID generating section 420 performs Step S2040.

At Step S2040, random block generating section 410 randomly selects mask value blocks from a pair of mask value blocks to generate a random block.

At Step S2050, inquiry ID generating section 420 generates an inquiry ID by embedding an encryption key in the result of logical XOR operation of a group ID and the random block in accordance with the above-mentioned key embedding rule.

At Step S2060, transmitting section 430 transmits the inquiry ID to the destination terminal by broadcasting the inquiry ID to communication network 200.

At Step S2020, inquiry ID generating section 420 determines whether the end of processing is instructed through user operation via a user interface provided at transmitting terminal 400. If the end of processing is not instructed (S2020: NO), inquiry ID generating section 420 performs Step S2010 again; otherwise (S2020: YES), inquiry ID generating section 420 terminates the processing.

The above-mentioned process flow allows transmitting terminal 400 to transmit an encryption key embedded in a different inquiry ID each time the encryption key needs to be transmitted.

Figure 10:
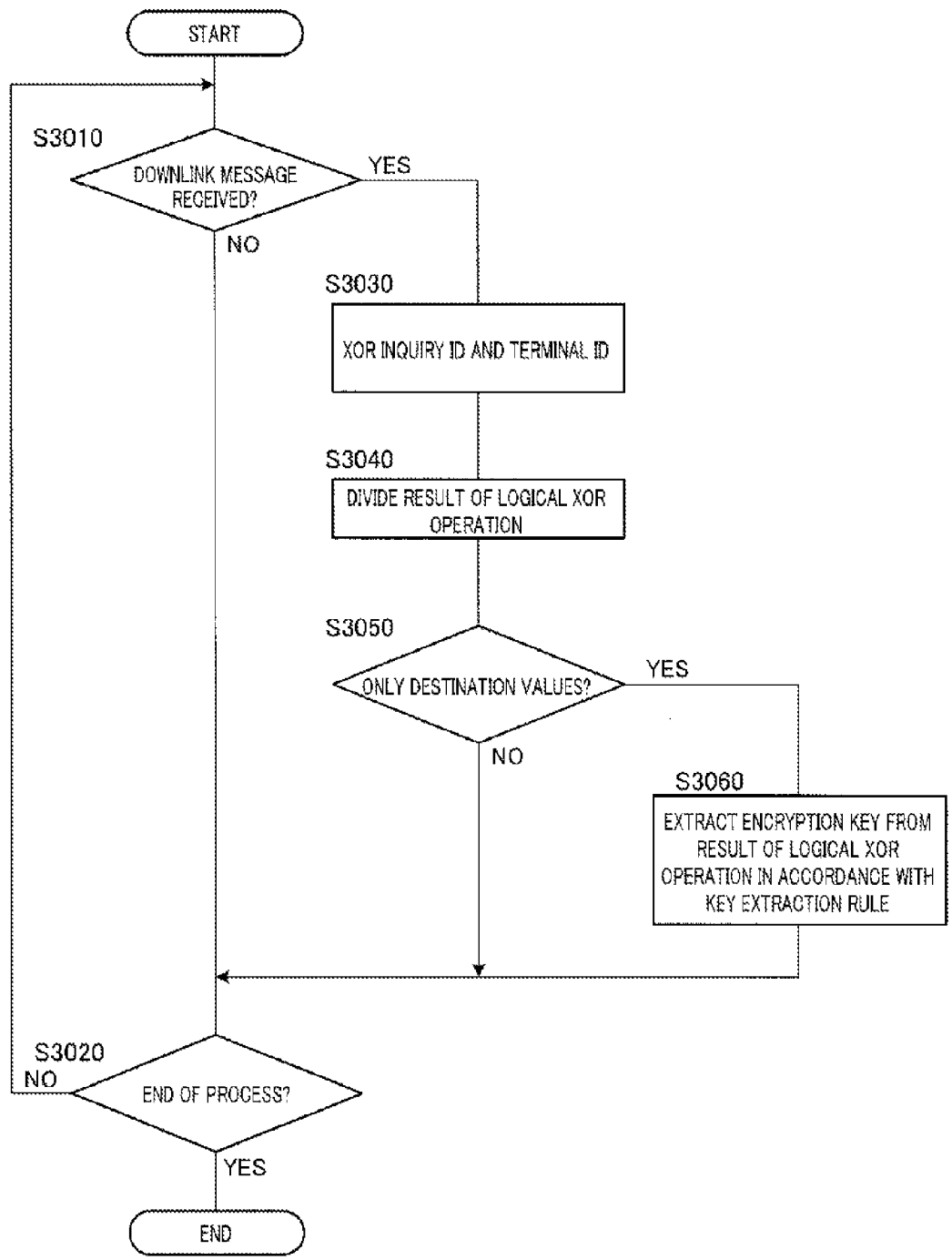
FIG. 10 is a flow chart illustrating an exemplary operation of the receiving terminal in accordance with Embodiment 1 of the present invention.

FIG. 10 is a flow chart illustrating an exemplary operation of receiving terminal 500.

It is assumed that receiving terminal 500 already has a terminal ID assigned by ID assigning apparatus 300. When receiving a terminal ID from ID assigning apparatus 300, receiving terminal 500 may transmit a reply indicating its acceptance or rejection.

At Step S3010, receiving section 520 determines the reception of a downlink message broadcast by transmitting terminal. If the downlink message is not yet received (S3010: NO), receiving section 520 performs Step S3020; otherwise (S3010: YES), receiving section 520 performs Step S3030.

At Step S3030, inquiry ID analyzing section 525 acquires the terminal ID of the receiving terminal 500 from terminal ID retaining section 510 and XORs the inquiry ID and terminal ID.

At Step S3040, inquiry ID analyzing section 525 divides the result of logical XOR operation of the inquiry ID and terminal ID into blocks of the above-mentioned given bit size (3 for this embodiment).

At Step S3050, inquiry ID analyzing section 525 determines whether the result of logical XOR operation consists of only destination value blocks from the destination value block group of {100, 010, 011 and 101}. More specifically, inquiry ID analyzing section 525, for example, preliminarily retains the destination value block group and compares each of blocks into which the result of logical XOR operation is divided with a destination value block of the destination value block group. If the result of logical XOR operation is not a concatenation of only destination value blocks (S3050: NO), inquiry ID analyzing section 525 performs Step S3020. If the result of logical. XOR operation is a concatenation of only destination value blocks (S3050: YES), inquiry ID analyzing section 525 performs Step S3060.

At Step S3060, encryption key extracting section 530 extracts an encryption key from the result of logical XOR operation of the inquiry ID and the terminal ID in accordance with the above-mentioned key extraction rule.

At Step S3020, inquiry ID analyzing section 525 determines whether the end of processing is instructed through user operation via a user interface. If the end of processing is not instructed (83020: NO), inquiry ID analyzing section 525 performs Step S3010 again; otherwise (S3020: YES), inquiry ID analyzing section 525 terminates the processing.

The above-mentioned process flow allows receiving terminals 500 to receive an inquiry ID addressed to the group to which receiving terminals 500 belong and extract an encryption key successfully each time the inquiry ID is transmitted by transmitting terminal 400.

As shown above, communication system 100 in accordance with this embodiment can communicate with a specific large number of apparatuses with encryption keys shared among them. Communication system 100 assigns a terminal ID and generates an inquiry ID by XORing bit sequences and allows only receiving terminals belonging to a group to extract encryption keys successfully, thereby enabling secure sharing of encryption keys.

Unlike conventional technology, communication system 100 has no relationship between the group ID and the encryption key. In other words, even if a group ID and an encryption key are leaked, communication system 100 can limit the impact to the receiving terminals 500 belonging to the same group. Unlike the conventional technology, which transmits a destination group ID in the form of a plain text, communication system 100 uses a random block to convert a destination group ID into a random value to be used for communications. This allows communication system 100 to keep a group to which an individual downlink message is addressed unknown to terminals not affiliated to the group. This prevents a malicious third party who sniffs and uses communication for malicious purposes from identifying it. In conclusion, communication system 100 can share encryption keys more securely than the conventional technology.

Communication system 100 can secure the terminal ID and/or group ID of each of receiving terminals 500, thereby preventing third parties from tracing communications.

The only control item essential for communication system 100 to designate communication destinations is the group ID, resulting in memory saving at transmitting terminal 400. Communication system 100 can transmit an encryption key together with a group ID in a bit sequence of the same size as that of the group ID, thereby reducing the length of a downlink message. This indicates communication system 100 can share encryption keys with a limited resource.

Communication system 100 does not necessarily have ID assigning apparatus 300, in which case each of receiving terminals 500 may have a terminal ID preliminarily embedded in a production line, the terminal ID being assigned using, for example, the above-mentioned assigning scheme.

Embodiment 2

Embodiment 2 of the present invention describes a transmitting terminal that collects terminal data retained by receiving terminals in each group, using shared encryption keys. A transmitting terminal and receiving terminals in accordance with this embodiment are the same as those used in a communication system similar to that shown in FIG. 1 in Embodiment 1.

In this embodiment, each terminal uses a common encryption scheme to encrypt and decrypt communication data. Such encryption scheme is based on, for example, advanced encryption standard (AES) or data encryption standard (DES).

The configuration of each apparatus in accordance with this embodiment will now be described.

Figure 11:
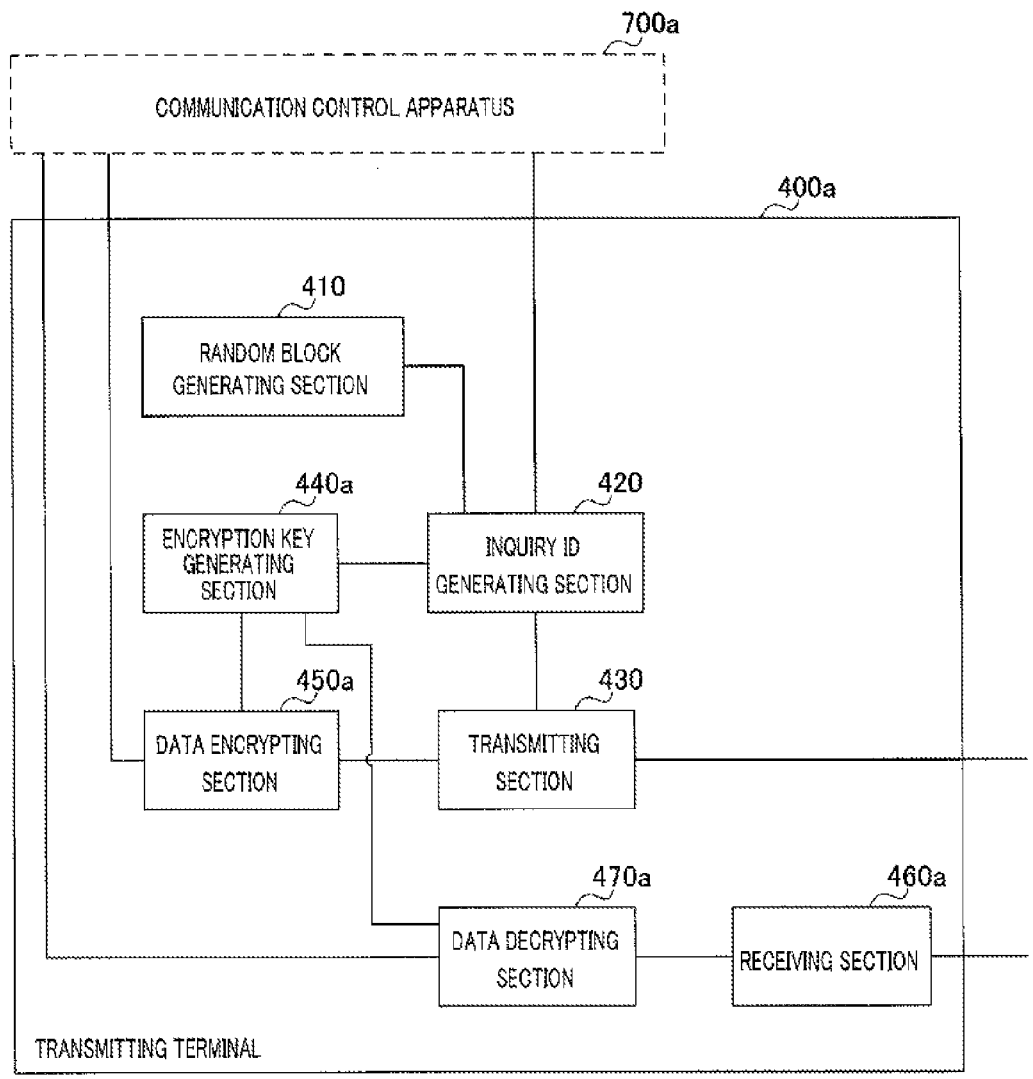
FIG. 11 is a block diagram showing the configuration of a receiving terminal in accordance with Embodiment 2 of the present invention.

FIG. 11 is a block diagram showing the configuration of a transmitting terminal in accordance with this embodiment, which corresponds to FIG. 4 in Embodiment 1. The same functional units as those in FIG. 4 are given the same numbers and the description thereof is omitted.

In FIG. 11, transmitting terminal 400a further includes encryption key generating section 440a, data encrypting section 450a, receiving section 460a and data decrypting section 470a.

In this embodiment, transmitting terminal 400a receives a command from communication control apparatus 700a to collect data from a designated group. Upon issuing of the command, communication control apparatus 700a transmits transmitting terminal 400a communication data and a group ID, where the communication data includes a command to transmit terminal data retained by receiving terminals to transmitting terminal 400a (hereinafter referred to as "uplink data transmission command). Each time a group ID is received from communication control apparatus 700a, inquiry ID generating section 420 determines the necessity to generate an inquiry ID and instructs encryption key generating section 440a to generate an encryption key. Communication control apparatus 700a may be an apparatus provided integrally with transmitting terminal 400a or provided separately from transmitting terminal 400a.

Encryption key generating section 440a generates a random bit sequence as the above-mentioned encryption key.

More specifically, for example, in response to a request from inquiry ID generating section 420, encryption key generating section 440a generates a random number to generate an encryption key, the random number being of the same bit size as that of an encryption key (3 for this embodiment). Encryption key generating section 440a passes the generated encryption key to inquiry ID generating section 420, data encrypting section 450a, and data decrypting section 470a.

Data encryption section 450a encrypts communication data with an error detection code added using the encryption key to generate encrypted data.

More specifically, for example, each time communication data is received from communication control apparatus 700a, data encrypting section 450a encrypts the communication data using an encryption key received from encryption key generating section 440a in response to the communication data. Data encryption section 450a calculates a checksum for the communication data, adds the checksum to the communication data, encrypts the communication data with the checksum added using the above-mentioned common encryption scheme(s) to generate encrypted data EK, and then passes the generated encrypted data to transmitting section 430.

The checksum is one of the error detection codes; data subject to error detection is regarded as a numeric value and the sum of bits is calculated to obtain a checksum. Whether the communication data contains an error can be determined by comparing the sum of the bits in communication data with the checksum. In this embodiment, whether the encrypted data is decoded successfully, i.e., whether the encryption key is shared successfully can be determined by the added checksum.

Transmitting section 430 generates and transmits a downlink message containing an inquiry ID and encrypted data to multiple apparatuses.

More specifically, for example, transmitting section 430 generates and transmits a downlink message containing an inquiry ID and encrypted data EK to a destination terminal.

Figure 12:
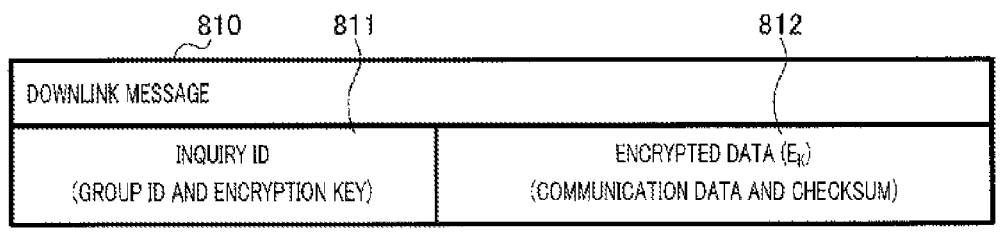
FIG. 12 shows an exemplary structure of a downlink message in accordance with Embodiment 2 of the present invention.

FIG. 12 shows an exemplary structure of a downlink message.

As shown in FIG. 12, downlink message 810 includes inquiry ID 811 and encrypted data 812 (EK). As described above, inquiry ID 811 contains a group ID and an encryption key. As described above, encrypted data 812 (EK) contains communication data with a checksum added (combined). The encryption key used to generate encrypted data 812 (EK) is the same as that contained in inquiry ID 811. A receiving terminal that extracts an encryption key from downlink message 810, for example, uses the encryption key to encrypt communication data to be transmitted to transmitting terminal 400*a*, and then transmits the encrypted communication data to transmitting terminal 400*a* in an uplink message.

Receiving section 460*a* in FIG. 11 receives the uplink message from receiving terminal 500*a* (refer to FIG. 14), the uplink message containing the encrypted data obtained by encrypting communication data.

More specifically, for example, receiving section 460*a* includes a communication interface (not shown) connected to communication network 200. Receiving section 460*a* receives an uplink message sent from a receiving terminal to transmitting terminal 400*a*. The uplink message contains a checksum-added terminal ID and communication data as encrypted data, the checksum-added terminal ID and communication data being encrypted using an encryption key shared with the downlink message. Receiving section 460*a* passes the encrypted data contained in the received uplink message to data decrypting section 470*a*.

Figure 13:
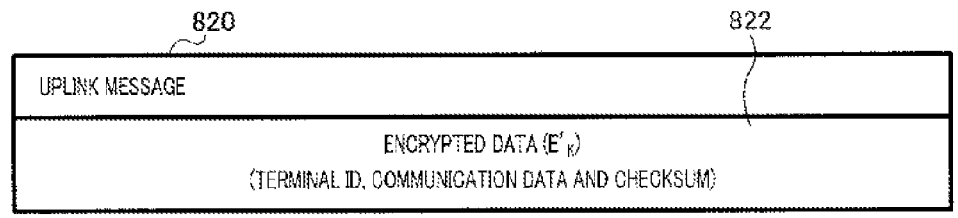
FIG. 13 shows an exemplary structure of an uplink message in accordance with Embodiment 2 of the present invention.

FIG. 13 shows an exemplary structure of an uplink message.

As shown in FIG. 13, uplink message 820 contains encrypted data 822 (E'K). As described above, encrypted data 822 (E'K) contains the terminal ID of a source (receiving terminal) with a checksum added (combined) and communication data. The encryption key used to generate encrypted data 822 (E'K) is the same as that received by the receiving terminal in a downlink message.

Data decryption section 470*a* decrypts the encrypted data in the uplink message using the encryption key.

More specifically, for example, data decrypting section 470*a* uses the encryption key received from encryption key generating section 440*a* to decrypt the encrypted data received from receiving section 460*a*. Data decryption section 470*a* performs error detection on the decrypted source terminal ID and communication data using the checksum which is also decrypted similarly. If no error is detected, data decrypting section 470*a* transmits the decrypted terminal ID and communication data to, for example, communication control apparatus 700*a*.

Such transmitting terminal 400*a* can transmit an uplink data transmission command in a downlink message to a designated group securely, and extract terminal data successfully from the uplink message received.

Figure 14:
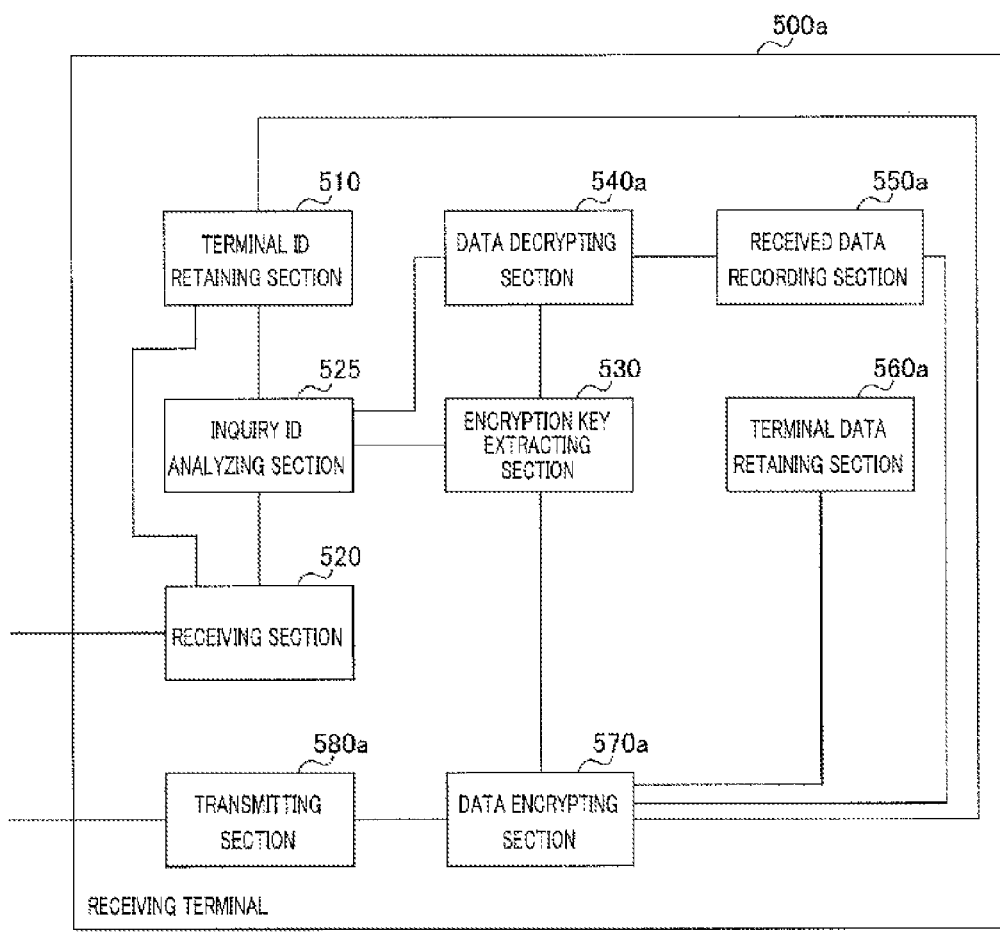
FIG. 14 is a block diagram showing the configuration of a receiving terminal in accordance with Embodiment 2 of the present invention.

FIG. 14 is a block diagram showing a configuration of a receiving terminal in accordance with this embodiment, which corresponds to FIG. 6 in Embodiment 1. The same functional units as those in FIG. 6 are given the same numbers and the description thereof is omitted.

As shown in FIG. 14, receiving terminal 500*a* include data decrypting section 540*a*, received data recording section 550*a*, terminal data retaining section 560*a*, data encrypting section 570*a* and transmitting section 580*a*.

In this embodiment, if a received downlink message is addressed to the group of receiving terminal 500*a* (i.e., S3050: YES in FIG. 10), inquiry ID analyzing section 525 receives the downlink message and passes the encrypted data contained in the downlink message to data decrypting section 540*a*. Encryption key extracting section 530 extracts and passes an encryption key to data decrypting section 540*a* and data encrypting section 570*a*. In response to a request from data encrypting section 570*a*, terminal ID retaining section 510 passes a retained terminal ID. In response to a request from data encrypting section 570*a*, terminal data retaining section 560*a* passes terminal data.

Data decryption section 540*a* decrypts the encrypted data in a downlink message using the encryption key.

More specifically, for example, data decrypting section 540*a* uses the encryption key received from encryption key extracting section 530 to decrypt the encrypted data received from inquiry ID analyzing section 525. Data decryption section 540*a* performs error detection on decrypted data using a checksum which is also decrypted similarly. If no error is detected, data decrypting section 540*a* passes the decrypted data (with or without the checksum) to received data recording section 550*a* as received data.

Received data recording section 550*a* records the decrypted data as received data.

More specifically, for example, received data recording section 550*a* stores the data received from data decrypting section 540*a* in an internal memory of receiving terminal 500*a*. Received data recording section 550*a* performs various processing, depending on the content of the received data.

In this embodiment, if the received data contains an uplink data transmission command, received data recording section 550*a* detects it. Received data recording section 550*a* instructs data encrypting section 570*a* to acquire terminal data and encrypt it as communication data.

Terminal data retaining section 560*a* retains data containing data that is to be transmitted to transmitting terminal 400*a* as terminal data. If transmitting terminal 400*a* is the above-mentioned sensor, terminal data is, for example, measurement data obtained by the sensor. In response to data encrypting section 570*a*, terminal data retaining section 560*a* passes the terminal data to data encrypting section 570*a*.

Data encryption section 570*a* encrypts communication data using an encryption key to generate encrypted data.

More specifically, for example, in response to an instruction from received data recording section 550*a*, data encrypting section 570*a* acquires a terminal ID from terminal ID retaining section 510, and acquires terminal data as communication data from terminal data retaining section 560*a*. Data encryption section 570*a* concatenates the terminal ID and the communication data and then adds an error detection code to the concatenated data. Data encryption section 570*a* encrypts the communication data with the error detection code added and the terminal data using the received encryption key to generate encrypted data. Data encryption section 570*a* passes the generated encrypted data to transmitting section 580*a*.

Transmitting section 580*a* generates and transmits an uplink message containing the encrypted data to transmitting terminal 400*a*.

More specifically, for example, transmitting section 580*a* includes a communication interface (not shown) connected to communication network 200. Transmitting section 580*a* generates and transmits an uplink message (see FIG. 13) containing the encrypted data to transmitting terminal 400*a*.

Such receiving terminal 500*a* can successfully extract the uplink data transmission command addressed to the group of receiving terminal 500*a* from a downlink message and then transmit terminal data in an uplink message securely.

The description of the configuration of each apparatus in accordance with this embodiment is now completed.

The operation of each apparatus in accordance with this embodiment will now be described.

Figure 15:
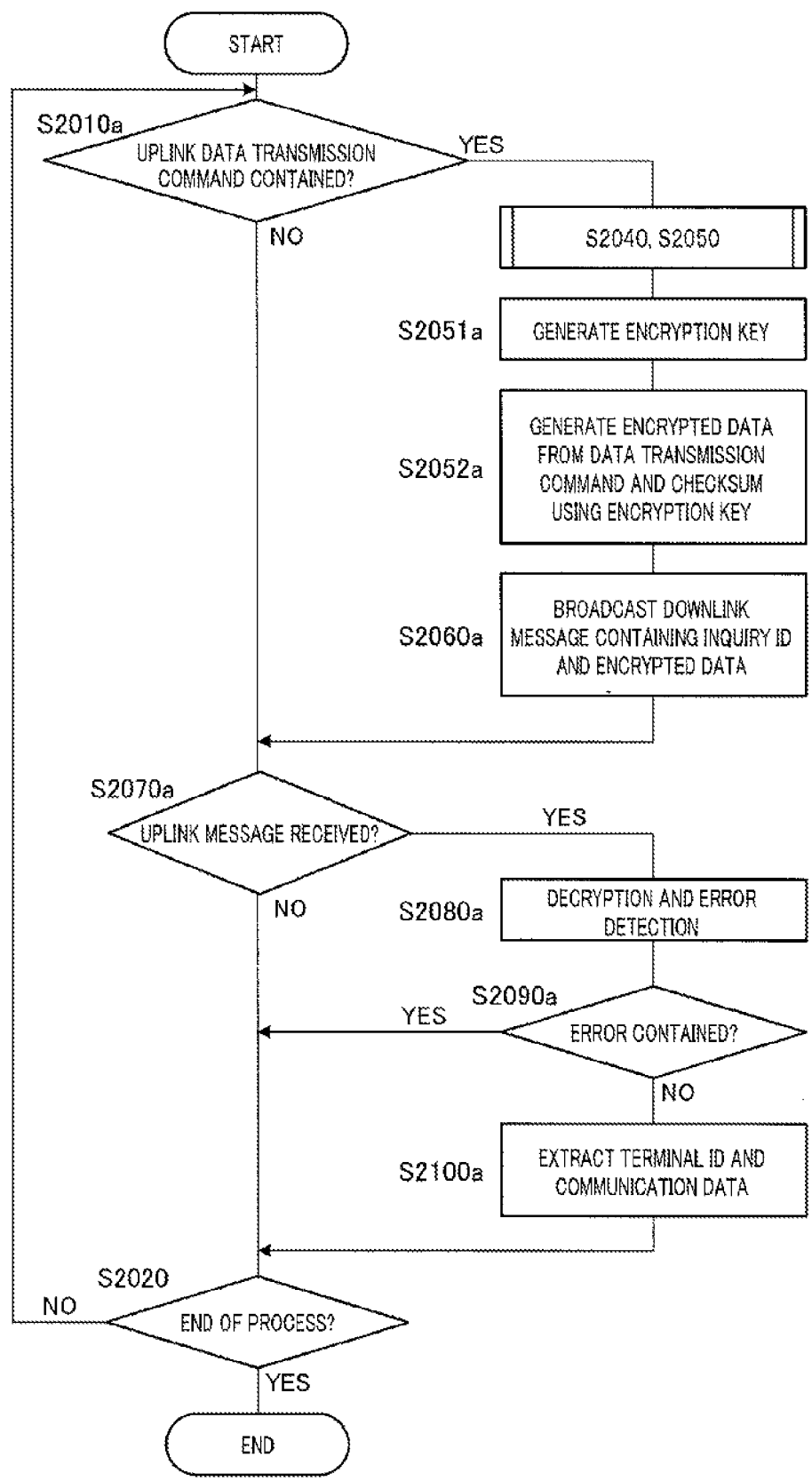
FIG. 15 is a flow chart illustrating an exemplary operation of the transmitting terminal in accordance with Embodiment 2 of the present invention.

FIG. 15 is a flow chart illustrating an exemplary operation of transmitting terminal 400a, which corresponds to FIG. 9 in Embodiment 1. The same functional units as those in FIG. 9 are given the same numbers and the description thereof is omitted.

At Step S2010a, inquiry ID generating section 420 and data encrypting section 450a determines whether they have an uplink data transmission command addressed to a group. More specifically, inquiry ID generating section 420 and data encrypting section 450a determines whether they have received a combination of a group ID and communication data containing an uplink data transmission command from communication control apparatus 700a.

If such command has not been received (S2010a: NO), inquiry ID generating section 420 and data encrypting section 450a perform Step S2070a described below; otherwise (S2010a: YES), inquiry ID generating section 420 and data encrypting section 450a perform Step S2051a through Step S2040-S2050.

At Step S2051a, encryption key generating section 440a generates a random bit sequence as an encryption key.

At Step S2052a, data encrypting section 450a generates encrypted data from communication data containing the uplink data transmission command and a checksum using an encryption key. More specifically, data encrypting section 450a adds a checksum to data obtained by concatenating an terminal ID and communication data, and encrypts the terminal ID and communication data with the checksum added using an encryption key.

At Step S2060a, transmitting section 430 broadcasts a downlink message (see FIG. 12) containing an inquiry ID and encrypted data EK to receiving terminal 500a of a designated group.

At Step S2070a, receiving section 460a determines whether it has received an uplink message (see FIG. 13). If receiving section 460a has not received an uplink message (S2070a: NO), it performs Step S2020; otherwise (S2070a: YES), receiving section 460a passes the encrypted data contained in the received uplink message to data decrypting section 470a and performs Step S2080a.

At Step S2080a, data decrypting section 470a decrypts the encrypted data using an encryption key and performs error detection on the decrypted terminal ID and communication data.

At Step S2090a, data decrypting section 470a determines whether the decrypted data contains an error. If the data contains an error (S2090a: YES), data decrypting section 470a performs Step S2020; otherwise (S2090a: NO), data decrypting section 470a performs Step S2100a.

At Step S2100a, data decrypting section 470a passes a pair of the decrypted terminal ID and communication data to communication control apparatus 700a, and performs Step S2020.

The above-mentioned process flow allows transmitting terminal 400a to collect terminal data from a designated group.

Figure 16:
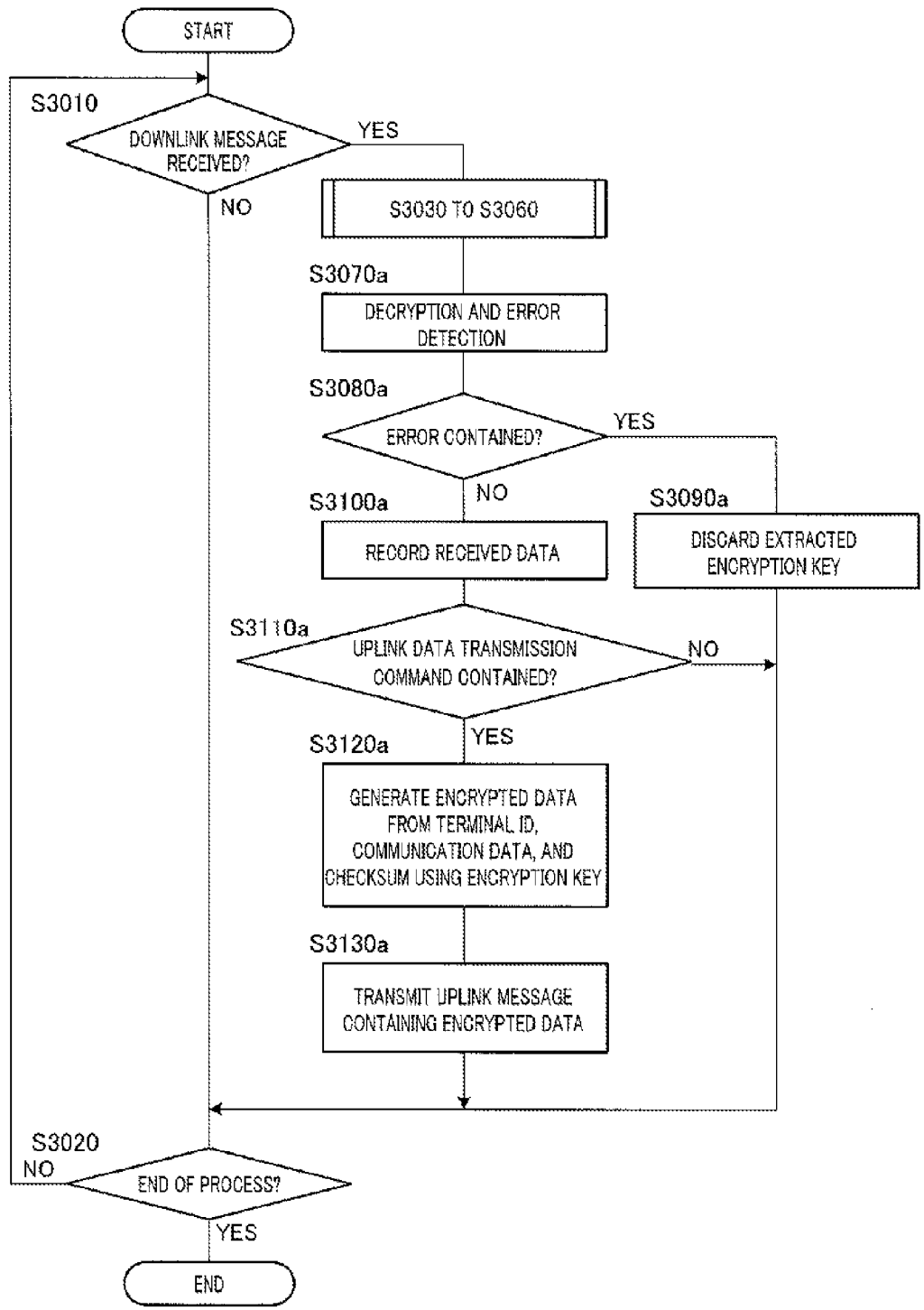
FIG. 16 is a flow chart illustrating an exemplary operation of the receiving terminal in accordance with Embodiment 2 of the present invention.

FIG. 16 is a flow chart illustrating an exemplary operation of a receiving terminal 500a, which corresponds to FIG. 10 in Embodiment 1. The same functional units as those in FIG. 10 are given the same numbers and the description thereof is omitted.

If a downlink message has been received (S3010: YES), receiving terminal 500a performs Step S3070a through Steps S3030 0 S3060. If receiving terminal 500a has failed to acquire an encryption key (i.e., Step S3050: NO), receiving terminal 500a may perform Step S3020.

At Step S3070a, data decrypting section 540a decrypts encrypted data using an encryption key and performs error detection on the decrypted terminal ID and communication data.

At Step S3080a, data decrypting section 540a determines whether the decrypted terminal ID and communication data contain an error. If an error is detected (S3080a: YES), data decrypting section 540a performs Step 3090a; otherwise (S3080a: NO), data decrypting section 540a performs Step S3100a.

At Step S3090a, data decrypting section 540a has encryption key extracting section 530 discard the encryption key received with the error-detected data and performs Step S3020. This is because at least either the encryption key or the communication data is likely to contain an error.

At Step S3100a, received data recording section 550a records the received data that has been the decrypted.

At Step S3110a, received data recording section 550a determines whether the received data that has been just recorded (the communication data contained in the downlink message) contains an uplink data transmission command. If the received data does not contain the uplink data transmission command (S3110a: NO), received data recording section 550a performs Step S3020; otherwise (S3110a: YES), received data recording section 550a performs Step S3120a. If the received data contains another command, received data recording section 550a performs processing in accordance with the command.

At Step S3120a, data encrypting section 570a acquires terminal data retained by terminal data retaining section 560a as communication data. Data encryption section 570a generates encrypted data from the terminal ID, the communication data, and a checksum using an encryption key. More specifically, data encrypting section 570a concatenates the terminal ID and communication data, calculates and adds a checksum to the concatenated data, and encrypts the checksum-added concatenated data using an encryption key.

At Step S3130a, transmitting section 580a transmits an uplink message (see FIG. 13) containing encrypted data E'K to transmitting terminal 400a and then performs Step S3020.

The above-mentioned process flow allows receiving terminals 500a to transmit terminal data to transmitting terminal 400a when an uplink data transmission command addressed to the group of receiving terminals 500a is received.

The description of the operation of each apparatus in accordance with this embodiment is now completed.

As shown above, a communication system including transmitting terminal 400a and receiving terminals 500a in accordance with this embodiment transmits and receives communication data using an encryption key shared securely, thereby allowing communication data to be transmitted and received securely.

In the communication system, if received data contains an uplink data transmission command, receiving terminals 500a transmit terminal data to transmitting terminal 400a, thereby allowing collection of information within a group easily and securely.

Unlike the conventional technology, which has a fixed one-to-one relationship between encryption key and terminal ID, the communication system uses a random value as an encryption key each time the encryption key is requested. This prevents an encryption key from being used to presume another encryption key requested at another time, even if the former encryption key is leaked. Accordingly, the communication system can transmit and receive communication data more securely than the conventional technology.

The communication system uses an encryption key for communication data with an error detection code added. This allows the communication system to detect a wrong use of an encryption key, thereby improving the reliability and security of communications.

If the bit size of an inquiry ID and the above-mentioned given bit size are variable, encryption key generating section 440a of transmitting terminal 400a may divide the bit size of the inquiry ID by the given bit size to determine the bit size of an encryption key each time.

In the communication system, transmission of communication data using an encryption key does not necessarily take place both at transmitting terminal 400a and receiving terminals 500a. For example, if transmission of communication data does not take place in the downlink direction, data encrypting section 450a in transmitting terminal 400a and data decrypting section 540a and received data recording section 550a in receiving terminal 500a are not necessarily provided. Meanwhile, transmission of communication data does not take place in the uplink direction, receiving terminal 500a does not necessarily include terminal data retaining section 560a, data encrypting section 570a, and transmitting section 580a. Likewise, transmitting terminal 400a does not necessarily include receiving section 460a and data decrypting section 470a.

Transmitting terminal 400a may memorize identification information of destinations (terminal group and receiving terminals 500a) with which encryption keys are shared, the same identification information being mapped to the corresponding encryption keys, thereby using a different encryption key for each communication. Alternatively, transmitting terminal 400a may add unique identification information, such as time information, to each downlink message containing an encryption key. In this case, receiving terminals 500a can inform transmitting terminal 400a to which downlink message (or to which encryption key) an uplink message corresponds by adding the identification information obtained from the downlink message to the uplink message.

Transmitting terminal 400a may transmit communication data other than an uplink data transmission command.

Embodiment 3

Embodiment 3 of the present invention describes a transmitting terminal that collects terminal data retained by each receiving terminal, using a shared encryption key. A transmitting terminal and a receiving terminal in accordance with this embodiment are similar to those used in the communication system in FIG. 1 in Embodiment 1.

The configuration of each apparatus will now be described.

Figure 17:
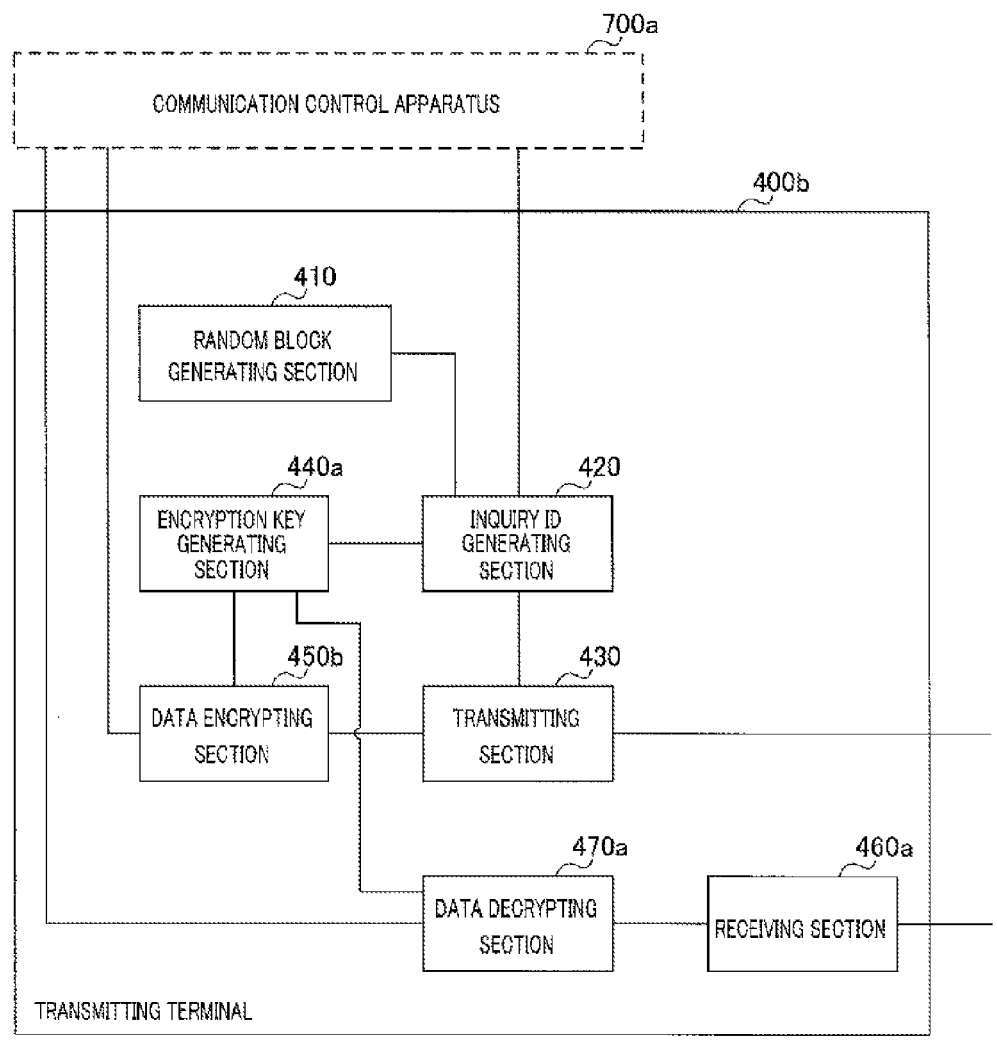
FIG. 17 is a block diagram showing the configuration of a transmitting terminal in accordance with Embodiment 3 of the present invention.

FIG. 17 is a block diagram showing the configuration of a transmitting terminal in accordance with this embodiment, which corresponds to FIG. 11 in Embodiment 2. The same functional units as those in FIG. 11 are given the same numbers and the description thereof is omitted.

In FIG. 17, transmitting terminal 400b includes data encrypting section 450b in place of data encrypting section 450a in Embodiment 2.

In this embodiment, transmitting terminal 400b receives a command from communication control apparatus 700a to collect data from a designated receiving terminal. Upon issuing of the command, communication control apparatus 700a transmits communication data containing an uplink data transmission command, the terminal ID of a receiving terminal from which data is collected, and the group ID of the group to which the receiving terminal belongs, to transmitting terminal 400b.

Data encryption section 450a encrypts data that specifies a destination of the data using an encryption key to generate encrypted data.

More specifically, for example, data encrypting section 450a combines and encrypts the communication data and terminal ID received from communication control apparatus 700a to generate encrypted data. The terminal ID combined with the communication data is the terminal ID of the receiving terminal designated as a terminal from which information is collected. Thus, the encrypted data contained in a downlink message sent by transmitting section 430 contains terminal ID.

Figure 18:
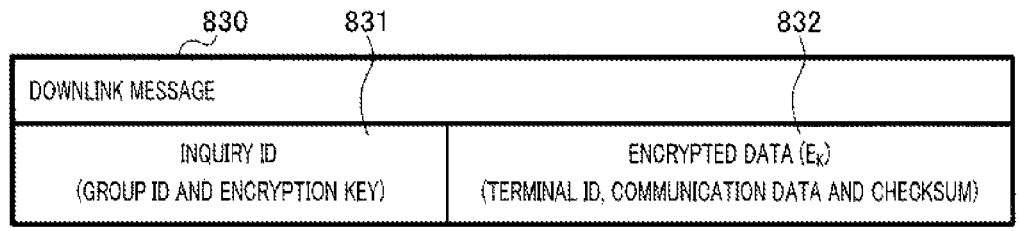
FIG. 18 shows an exemplary structure of a downlink message in accordance with Embodiment 3 of the present invention.

FIG. 18 shows an exemplary structure of a downlink message, which corresponds to FIG. 12 in Embodiment 2.

As shown in FIG. 18, downlink message 830 in this embodiment includes inquiry ID 831 and encrypted data 832 (EK). Inquiry ID 831 includes a group ID and an encryption key, as described above. Encrypted data 832 (EK) includes communication data with a checksum added (combined) and the terminal ID of a receiving terminal, as described above.

Such transmitting terminal 400b can transmit an uplink data transmission command securely in a downlink message to a designated receiving terminal and extract terminal data from a received uplink message.

Figure 19:
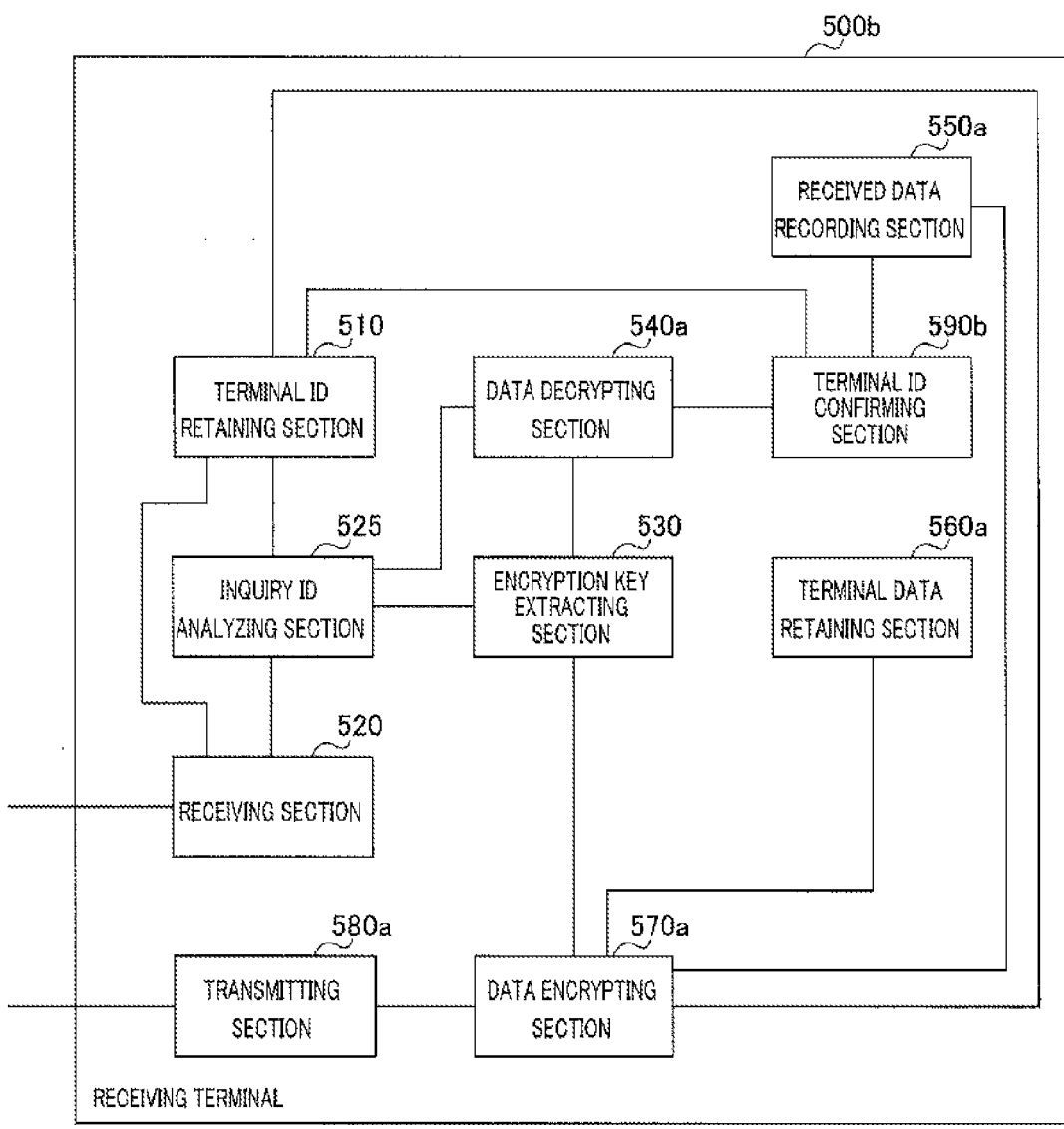
FIG. 19 is a block diagram showing the configuration of a receiving terminal in accordance with Embodiment 3 of the present invention.

FIG. 19 is a block diagram showing the configuration of a receiving terminal in accordance with this embodiment, which corresponds to FIG. 14 in Embodiment 2. The same functional units as those in FIG. 14 are given the same numbers and the description thereof is omitted.

In FIG. 19, receiving terminal 500b further includes terminal ID confirming section 590b.

In this embodiment, terminal ID retaining section 510 passes a retained terminal ID in response to a request from inquiry ID analyzing section 525, data encrypting section 570a, and terminal ID confirming section 590b. Data decryption section 540a passes decrypted communication data not only to received data recording section 550a but also to terminal ID confirming section 590b.

Terminal ID confirmation section 590b determines whether receiving terminal 500b is designated as a destination of the decrypted data in the decrypted data.

More specifically, for example, terminal ID confirming section 590b acquires the terminal ID of receiving terminal 500b from terminal ID retaining section 510 to determine whether the terminal ID of receiving terminal 500b is included in the decrypted data. If it is included, terminal ID confirming section 590b passes the data, with or without the terminal ID, to received data recording section 550a as received data. Received data recording section 550a records the decrypted data as received data provided that receiving terminal 500b is designated as a destination of the decrypted data in the decrypted data.

Such receiving terminal 500b can successfully extract an uplink data transmission command addressed to itself from a downlink message and transmit terminal data securely in an uplink message.

The description of the configuration of each apparatus is now completed.

The operation of each apparatus will now be described.

Figure 20:
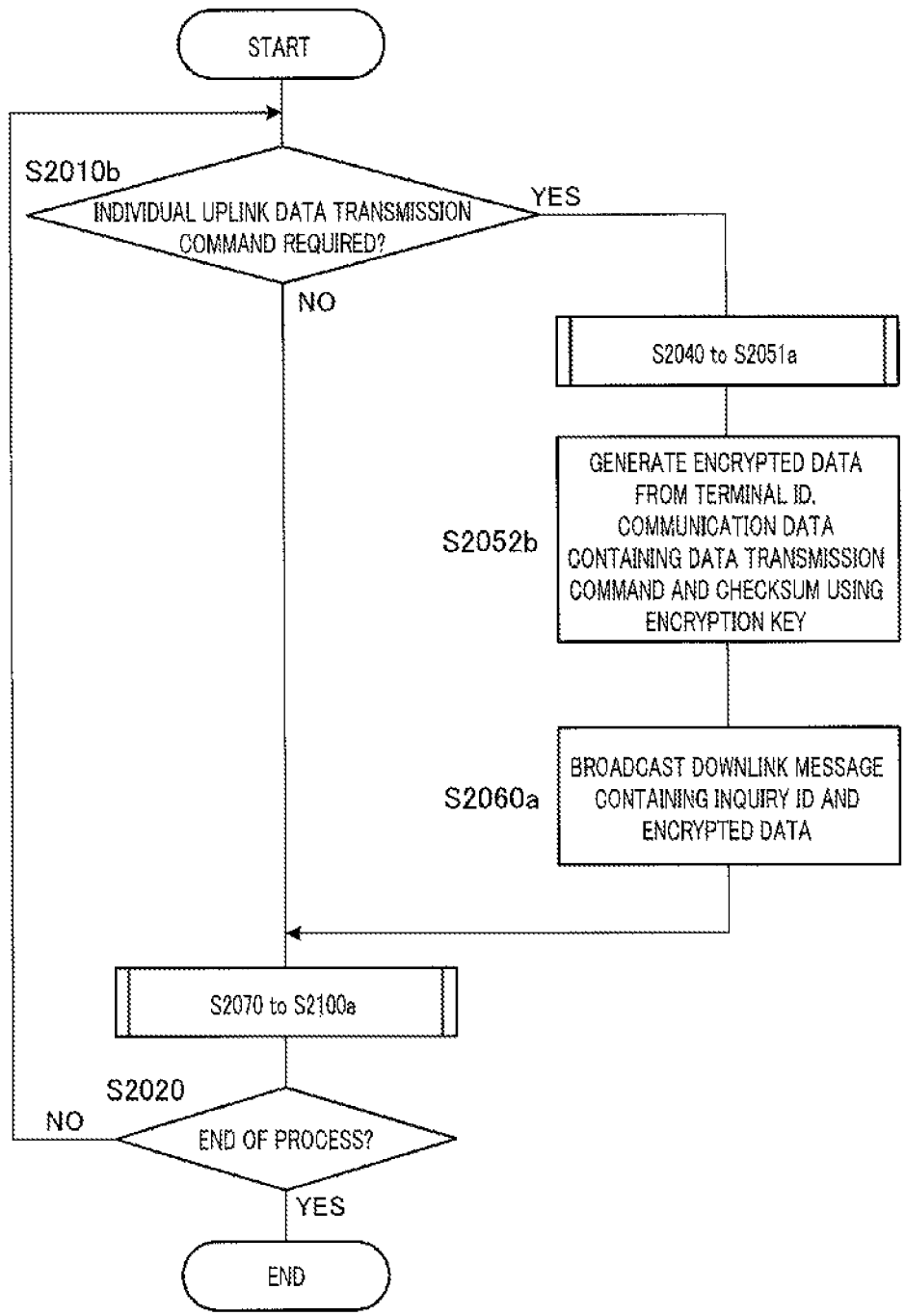
FIG. 20 is a flow chart illustrating an exemplary operation of the transmitting terminal in accordance with Embodiment 3 of the present invention.

FIG. 20 is a flow chart illustrating an exemplary operation of the transmitting terminal 400b in accordance with this embodiment, which corresponds to FIG. 15 in Embodiment 2. The same functional units as those in FIG. 15 are given the same numbers and the description thereof is omitted.

At Step S2010b, inquiry ID generating section 420 and data encrypting section 450b determines the necessity of an individual uplink data transmission command with receiving terminal 500b designated. More specifically, inquiry ID generating section 420 and data encrypting section 450b determines whether a combination of a group ID, a terminal ID, and communication data has been received from communication control apparatus 700a. If an individual uplink data transmission command is not necessary (S2010: NO), inquiry ID generating section 420 and data encrypting section 450b perform Step S2070a; otherwise (S2010b: YES), inquiry ID generating section 420 and data encrypting section 450b perform Step S2052b through Step S2040-S2051a.

At Step S2052b, data encrypting section 450b generates encrypted data from the designated terminal ID, communication data containing an uplink data transmission command and a checksum using an encryption key. More specifically, data encrypting section 450b concatenates the terminal ID and communication data, calculates and adds a checksum to the concatenated data, and encrypts the checksum-added concatenated data using an encryption key. Data encryption section 450b performs Step S2060a. Thus, a downlink message (see FIG. 18) which contains an inquiry ID and encrypted data EK is broadcast to the destination terminal, encrypted data EK containing the terminal ID of the destination terminal and data.

The above-mentioned process flow allows transmitting terminal 400b to collect terminal data from a designated receiving terminal 500b.

Figure 21:
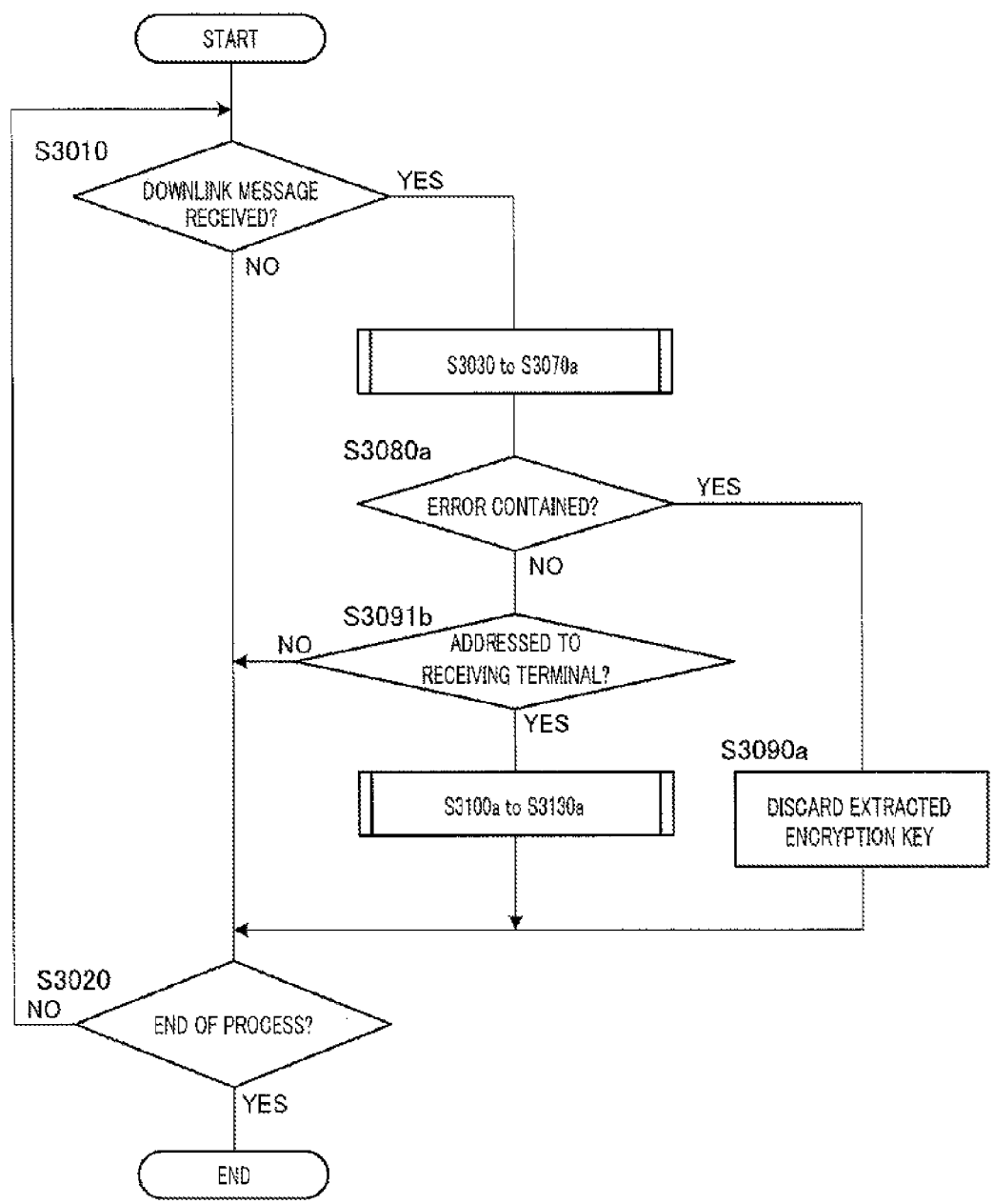
FIG. 21 is a flow chart illustrating an exemplary operation of the receiving terminal in accordance with Embodiment 3 of the present invention.

FIG. 21 is a flow chart illustrating an exemplary operation of receiving terminal 500b, which corresponds to FIG. 16 in Embodiment 2. The same functional units as those in FIG. 16 are given the same numbers and the description thereof is omitted.

If a decrypted terminal ID and communication data contains no error (S3080b: NO), data decrypting section 540a performs Step S3091b.

At Step S3091b, terminal ID confirming section 590b compares the terminal ID contained in the downlink message with the terminal ID of receiving terminal 500b to determine whether communication data in the downlink message is addressed to receiving terminal 500b. If the communication data is not addressed to receiving terminal 500b (S3091b: NO), terminal ID confirming section 590b performs Step S3020. The fact that the communication data is not addressed to receiving terminal 500b means that, for example, the communication data is addressed to any other apparatus having the same group ID. If the communication data is addressed to receiving terminal 500b (S3091b: YES), terminal ID confirming section 590b performs Step S3100a. Thus, if the received data is an uplink data transmission command, the terminal data is transmitted to transmitting terminal 400b.

The above-mentioned process flow allows receiving terminal 500b to transmit its terminal data to transmitting terminal 400b upon reception of an uplink data transmission command addressed to receiving terminal 500b.

The description of the operation of each apparatus in accordance with this embodiment is now completed.

As shown above, the communication system including transmitting terminal 400b and receiving terminal 500b in accordance with this embodiment can collect data securely from a certain receiving terminal 500b. This can reduce unnecessary transmission of an uplink message and thus communication load when data collection is needed not on a group basis but on a terminal basis.

Note that transmitting terminal 400b can transmit communication data other than the uplink data transmission command.

Embodiment 4

Embodiment 4 of the present invention describes a transmitting terminal, that has all the receiving terminals in each group and generates their group ID and terminal IDs concurrently. The transmitting terminal and receiving terminals in accordance with this embodiment are those used in the communication system similar to that in FIG. 1 in Embodiment 1. In this embodiment, the terminal ID generation function of the ID assigning apparatus in Embodiment 1 is provided in a receiving terminal, and the terminal ID management function thereof is provided in a transmitting terminal. This indicates that the communication system does not necessarily include an ID assigning apparatus in Embodiment 1.

The configuration of each apparatus in accordance with this embodiment will now be described.

Figure 22:
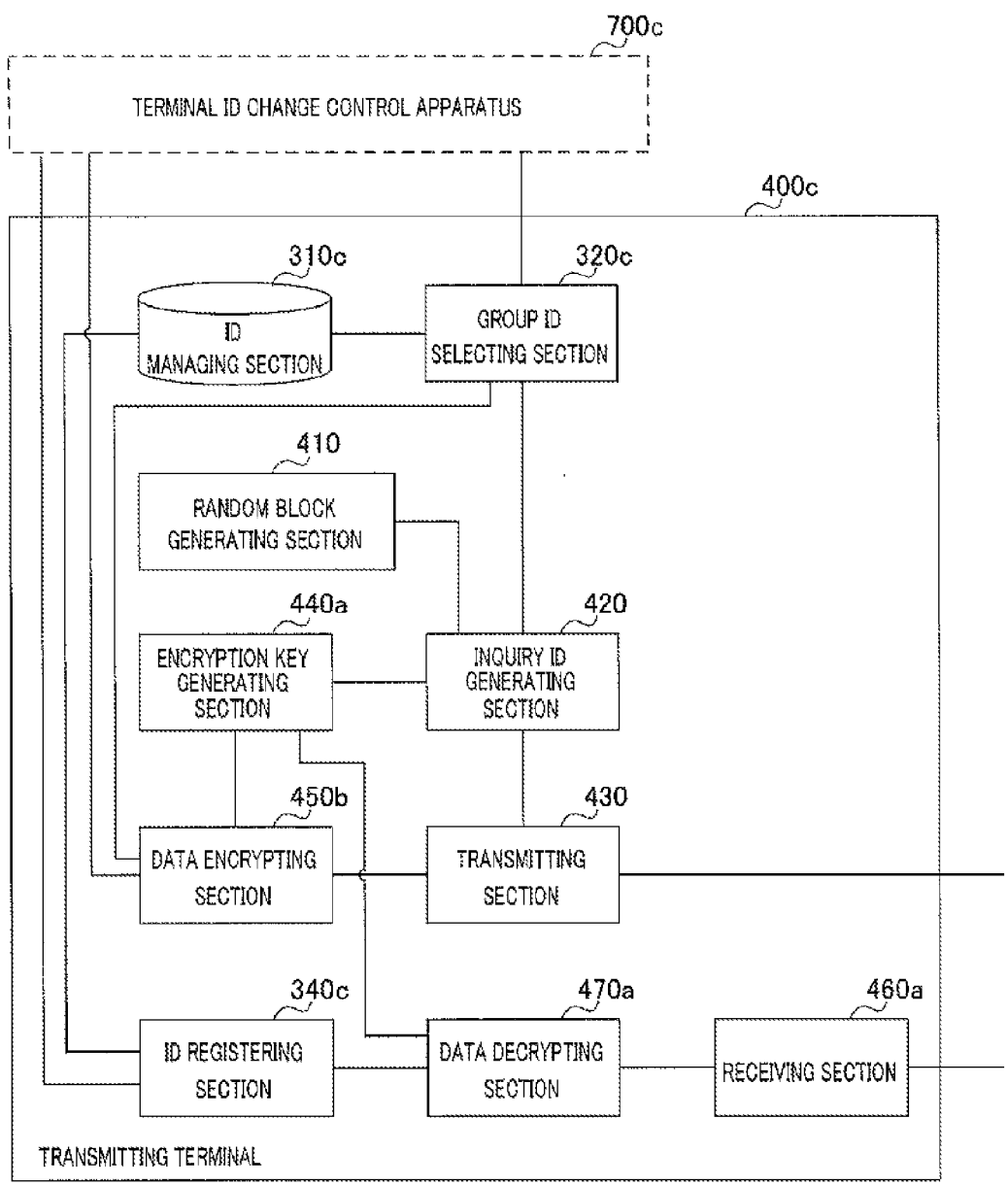
FIG. 22 is a block diagram showing the configuration of a transmitting terminal in accordance with Embodiment 4 of the present invention.

FIG. 22 is a block diagram showing the configuration of a transmitting terminal in accordance with this embodiment of the present invention, which corresponds to FIG. 11 in Embodiment 2. The same functional units as those in FIG. 11 are given the same numbers and the description thereof is omitted.

In FIG. 22, transmitting terminal 400c further includes ID managing section 310c, group ID selecting section 320c, and ID registering section 340c.

In this embodiment, transmitting terminal 400c receives a terminal ID change command from terminal ID change control apparatus 700c, which may be provided integrally with or separately from transmitting terminal 400c.

The ID change command is a command to change the group ID and terminal IDs of receiving terminals in accordance with the above-mentioned predetermined assignment rule. When an ID change command is issued, transmitting terminal 400a receives the group ID of receiving terminals (destination terminals) to be changed and communication data instructing changes in terminal IDs, from terminal ID change control apparatus 700c. In this embodiment, data decrypting section 470a passes decrypted terminal IDs and communication data from receiving terminals to ID registering section 340c.

ID managing section 310c provides a function similar to that of ID managing section 310 in Embodiment 1. ID managing section 310c manages assigned terminal IDs (group ID).

Group ID selecting section 320c provides a function similar to that of group ID selecting section 320 in Embodiment 1. Group ID selecting section 320c provides a group ID generated in accordance with the above-mentioned assignment rule to the user. Group ID selecting section 320c has a user to select a group ID under which terminal IDs are changed collectively (hereinafter referred to as "group ID subject to change" and accepts a changed group ID (hereinafter referred to as a "new group ID").

More specifically, for example, group ID selecting section 320c receives an ID change start command from terminal ID change control apparatus 700c. Upon issuing of this command, terminal ID change control apparatus 700c passes communication data containing an ID change command to transmitting terminal 400c. Each time the ID change command is received, group ID selecting section 320c uses ID managing section 310c to provide the user with a group ID generated in accordance with the above-mentioned assignment rule. Group ID selecting section 320c receives a selected group ID subject to change and a selected new group ID from the user. Group ID selecting section 320c passes the selected group ID subject to change to inquiry ID generating section 420 to instruct the same to generate an inquiry ID. Furthermore, group ID selecting section 320c passes the selected new group ID to data encrypting section 450b to instruct the same to encrypt it.

Thus, data containing the ID change command and the new group ID is encrypted before transmission.

ID registering section 340c provides a function similar to that of ID registering section 340 in Embodiment 1. ID registering section 340c assigns a terminal ID to a receiving terminal 500c so as to avoid duplication with an assigned terminal ID.

More specifically, for example, ID registering section 340c checks for duplication of terminal ID candidates newly generated by receiving terminals (hereinafter referred to as "new terminal ID"), the terminal ID candidates being contained in uplink messages sent in response to an ID change command. If a new terminal ID is the same as any other terminal ID, ID registering section 340c notifies the receiving terminal of the failure in registration; otherwise, ID registering section 340c notifies the user and the receiving terminal of the successful registration, and registers the terminal ID candidate to ID managing section 310c as a changed terminal ID.

Such transmitting terminal 400c can collectively instruct receiving terminals to generate and register their own terminal IDs (group ID), which enables a secure sharing of encryption keys. In other words, transmitting terminal 400c can collectively change the terminal IDs of multiple receiving terminals in a group.

Figure 23:
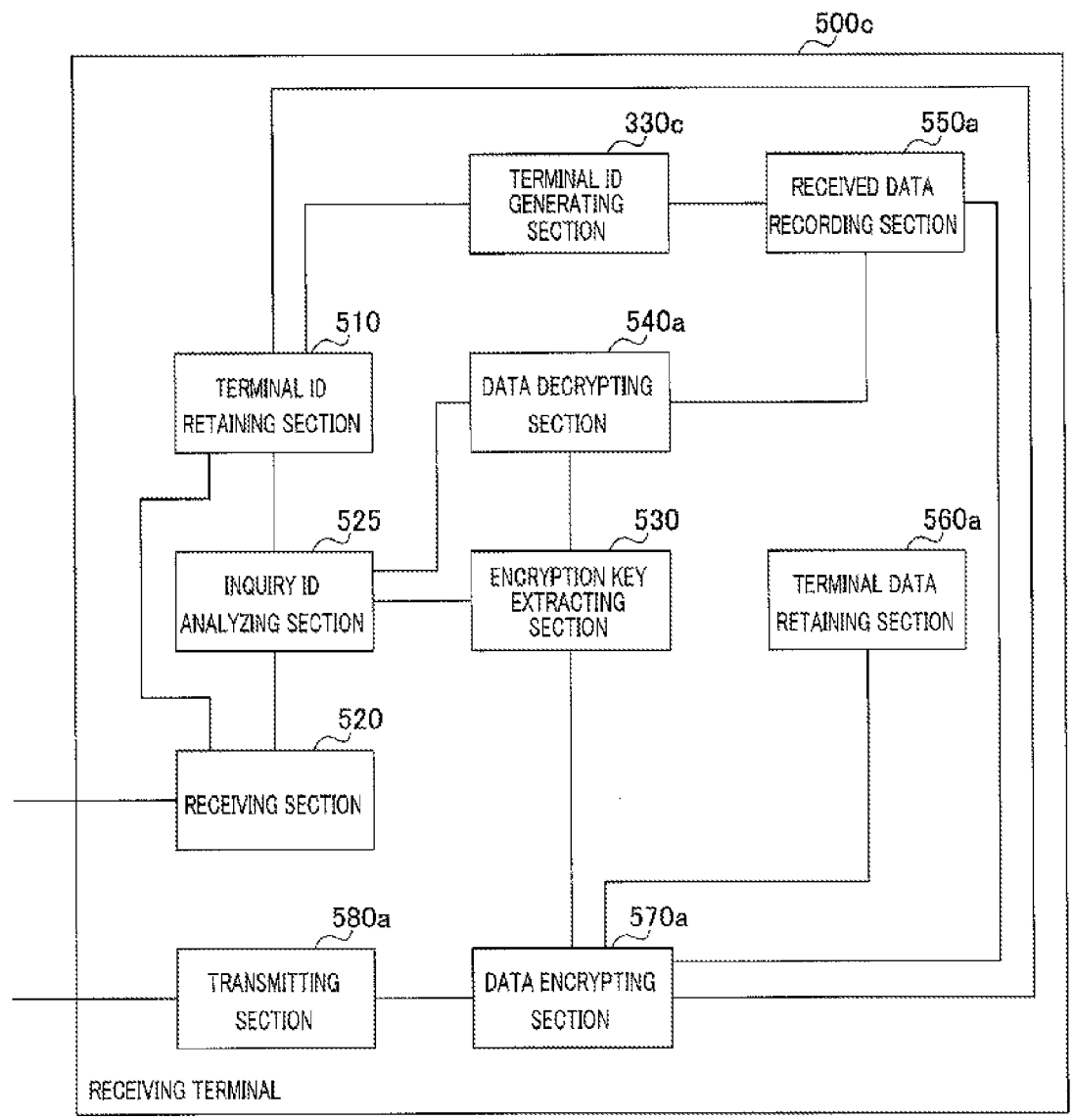
FIG. 23 is a block diagram showing the configuration of a receiving terminal in accordance with Embodiment 4 of the present invention.

FIG. 23 is a block diagram showing the configuration of a receiving terminal in accordance with this embodiment, which corresponds to FIG. 14 in Embodiment 2. The same functional units as those in FIG. 14 are given the same numbers and the description thereof is omitted.

In FIG. 23, receiving terminals 500c further includes terminal ID generating section 330c.

In this embodiment, received data recording section 550a records a new group ID contained in the encrypted data of a downlink message along with received data. If the received data contains an ID change command, received data recording section 550a passes the new group ID to terminal ID generating section 330c to instruct the same to generate terminal IDs affiliated to the new group ID.

Terminal ID generating section 330c provides a function similar to that of terminal ID generating section 330 in Embodiment 1. Terminal ID generating section 330c generates the terminal IDs of receiving terminals 500c, the terminals ID being affiliated to the new group ID, in accordance with the above-mentioned assignment rule.

More specifically, for example, in response to an instruction from received data recording section 550a, terminal ID generating section 330c generates terminal IDs affiliated to the received new group ID in accordance with the assignment rule. Terminal ID generating section 330c updates the terminal IDs retained by terminal ID retaining section 510 with the generated terminal IDs.

If received data contains notification indicating a failure in registration of a new terminal ID generated by receiving terminal 500c, received data recording section 550a should preferably instructs terminal ID generating section 330c to restore the terminal ID to the last one.

The description of the configuration of each apparatus in accordance with this embodiment is now completed.

The operation of each apparatus in accordance with this embodiment will be now described.

Figure 24:
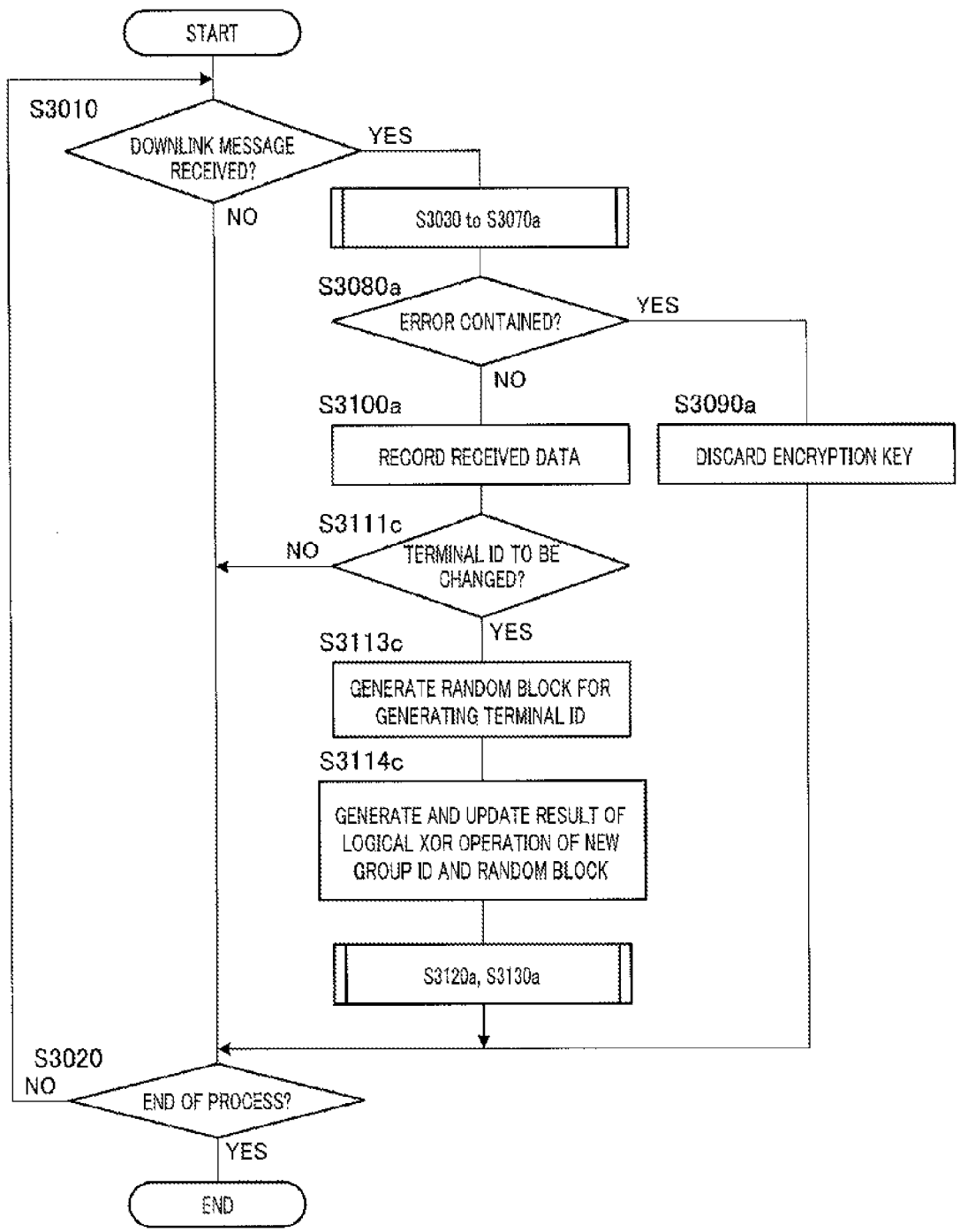
FIG. 24 is a flow chart illustrating an exemplary operation of the receiving terminal in accordance with Embodiment 4 of the present invention.

FIG. 24 is a flow chart illustrating an exemplary operation of the receiving terminal in accordance with this embodiment; which corresponds to FIG. 16 in Embodiment 2. The same functional units as those in FIG. 16 are given the same numbers and the description thereof is omitted.

Received data recording section 550a records received data contained in a downlink message addressed to receiving terminal 500c (S3100) and then performs Step S3111c.

At Step S3113c, received data recording section 550a determines whether the received data that has been just recorded contains an ID change command. If not (S3111c: NO), received data recording section 550a performs Step S3020; otherwise (S3111c: YES), received data recording section 550a performs Step S3113c. If the received data contains another command, received data recording section 550a performs processing in accordance with the command.

At Step S3113c, terminal ID generating section 330c generates a random block using a pair of mask value blocks.

At Step S3114c, terminal ID generating section 330c generates the result of logical XOR operation of a new group ID and the random block as a terminal ID, updates the terminal ID retained by terminal ID retaining section 510 with the generated terminal ID and then performs Step S3120a in FIG. 16. The updated terminal ID (hereinafter referred to as a "new terminal ID") is encrypted in data encrypting section 570a and transmitted to transmitting terminal 400c. Note that terminal ID retaining section 510 also retains the unchanged terminal ID until it receives a downlink message indicating a successful registration from transmitting terminal 400 since the changed terminal ID is not necessarily registered.

The above-mentioned process flow allows receiving terminals 500c to generate and transmit new terminal IDs affiliated to a designated new group ID to transmitting terminal 400c securely when a command to change the ID of the group to which receiving terminals 500c are affiliated is received from transmitting terminal 400c. It also allows receiving terminal 500c to generate a terminal ID that enables a secure sharing of encryption keys.

Figure 25:
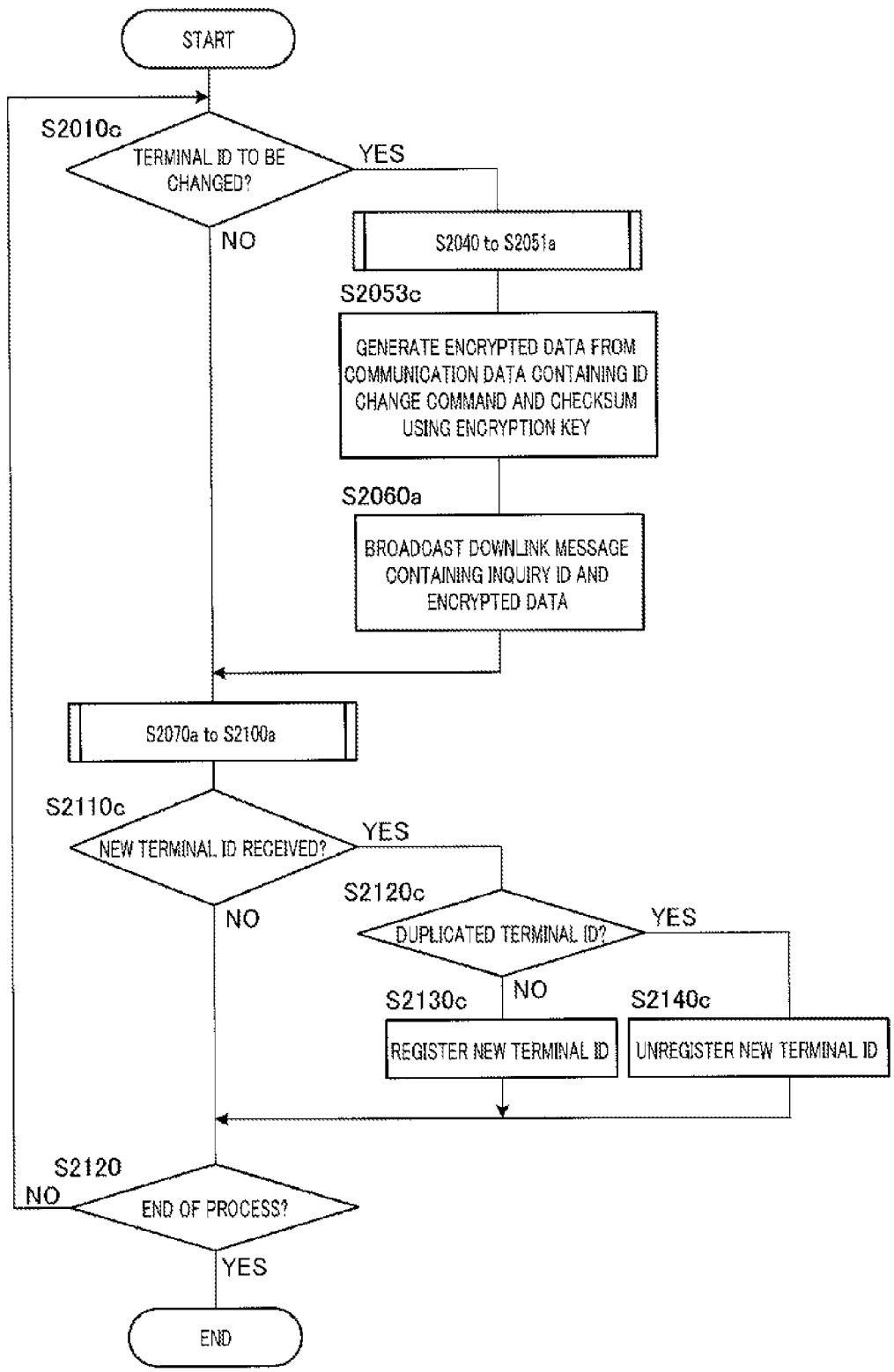
FIG. 25 is a flow chart illustrating an exemplary operation of the transmitting terminal in accordance with Embodiment 4 of the present invention.

FIG. 25 is a flow chart illustrating an exemplary operation of the transmitting terminal in accordance with this embodiment of the present invention, which corresponds to FIG. 15 in Embodiment 2. The same functional units as those in FIG. 15 are given the same numbers and the description thereof is omitted.

Data encryption section 450a generates an inquiry ID and an encryption key (S2051a) and then performs Step S2053c.

At Step S2053c, data encrypting section 450a generates encrypted data from communication data containing the ID change command and the checksum using an encryption key. Transmitting terminal 400c performs Step S2110c via Step S2070a.

At Step S2110c, ID registering section 340c determines whether a new terminal ID has been received in uplink data. More specifically, ID registering section 340c determines whether communication data in the uplink data contains a new terminal ID in response to the ID change command. If ID registering section 340c has not received a new terminal ID (2110c: NO), it performs Step S2020; otherwise (S2110c: YES), ID registering section 340c performs Step S2120c.

At Step S2120c, ID registering section 340c asks ID managing section 310c whether a new terminal ID has a duplicate terminal ID already registered. If not (S2120c:

NO), ID registering section 340 performs Step S2130c; otherwise (S2120c: YES), ID registering section 340c performs Step S2140c.

At Step S2130c, ID registering section 340c registers a new terminal ID received to ID managing section 310c, assigned it to receiving terminal 500, and then performs Step S2020.

At Step S2140c, ID registering section 340 does not register the received new terminal ID to ID managing section 310c and notifies the user and receiving terminal 500c of the failure in registration. Transmitting terminal 400c broadcasts an ID change command again.

The above-mentioned process flow allows transmitting terminal 400c to generate an ID change command for a designated group securely. Transmitting terminal 400c can register a terminal ID so as to avoid the issue of duplicated terminal IDs by receiving terminals 500c.

As shown above, in a communication system including transmitting terminal 400c and receiving terminals 500c in accordance with this embodiment, transmitting terminal 400c can collectively instructs the receiving terminals 500c affiliated to a certain group to change the group ID and the terminal IDs in accordance with the above-mentioned assignment rule. This facilitates the provision of a time-limited terminal ID of each of the receiving terminals 500c in the communication system, thereby enhancing communications security.

In this embodiment, transmitting terminal 400c issues an ID change command for a particular group. Alternatively, transmitting terminal 400c may change the terminal ID of a particular receiving terminal 500c, as in Embodiment 3.

The issue and change of a terminal ID may be performed by transmitting terminal 400c, in which case terminal ID generating section 330c is provided in transmitting terminal 400c. Data encryption section 450a of transmitting terminal 400c encrypts data containing the current terminal ID and a new terminal ID of a receiving terminal 500c and an instruction to change to the new terminal ID. Received data recording section 550a of receiving terminal 500c updates the terminal ID retained by terminal ID retaining section 510 in accordance with the instruction contained in the received data.

ID managing section 310c may be provided in, for example, terminal ID change control apparatus 700c.

Transmitting terminal 400c may change only a terminal ID, without changing a group ID, in which case the assignment rule issues a new terminal ID consisting of a bit sequence such that the results of logical XOR operation of the bit sequence with the affiliated group ID of pre-change terminal ID consists of only concatenated mask value blocks.

Embodiment 5

Embodiment 5 of the present invention describes destination terminals that are determined based on the conditions of receiving terminals with which encryption keys are to be shared (receiving terminals to which communication data is to be transmitted), such as the locations thereof. A transmitting terminal and receiving terminals in accordance with this embodiment are similar to those used in the communication system shown in FIG. 1 in Embodiment 1. In this embodiment, a group ID is used as a terminal ID. The assignment of a group ii is variable.

Figure 26:
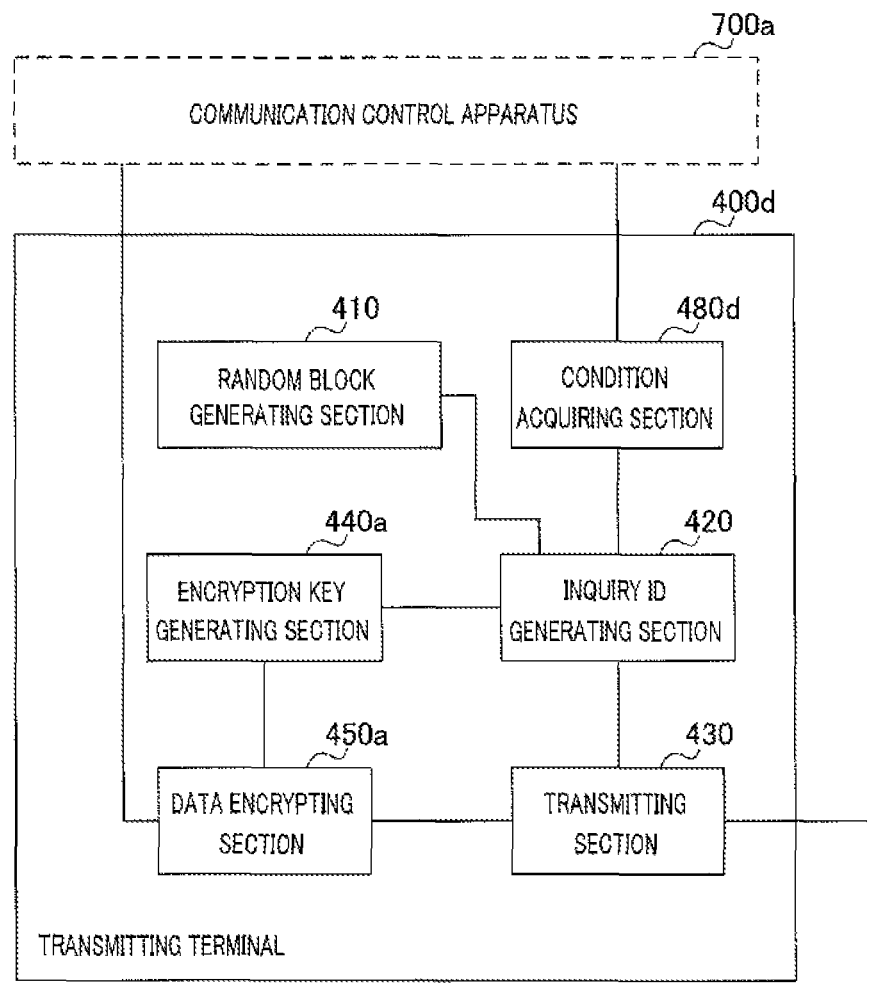
FIG. 26 is a block diagram showing the configuration of a transmitting terminal in accordance with Embodiment 5 of the present invention.

FIG. 26 is a block diagram showing the configuration of a transmitting terminal in accordance with this embodiment of the present invention, which corresponds to FIG. 11 in Embodiment 2. The same functional units as those in FIG. 11 are given the same numbers and the description thereof is omitted.

In FIG. 26, transmitting terminal 400d further includes condition acquiring section 480d. Transmitting terminal 400d has functional units as shown in Embodiments 1-4, but the drawings and description thereof are omitted.

In this embodiment, transmitting terminal 400d receives communication data to be transmitted to receiving terminals and conditions of the destination terminals states (hereinafter referred to as "terminal conditions") from communication control apparatus 700a. The terminal states refer to the states of a receiving terminal which can change over time, such as position information, air temperature, and a battery level. More specifically, transmitting terminal 400d receives a suit of communication data and terminal conditions from communication control apparatus 700a. This embodiment describes position information received as a terminal condition.

Condition acquiring section 480d acquires a condition of the terminal state of a receiving terminal with which an encryption key is to be shared (terminal condition) and passes a bit sequence indicating the terminal state of the acquired terminal condition to inquiry ID generating section 420 as IDs of receiving terminals (group ID in this embodiment).

More specifically, for example, condition acquiring section 480d has a preliminarily stored ID conversion table containing a correspondence relationship between possible position information and group IDs. Each time position information is received from communication control apparatus 700a as a terminal condition, condition acquiring section 480d uses the ID conversion table to convert the received position information to a group ID. Condition acquiring section 480d passes thus acquired group ID to inquiry ID generating section 420 as a group ID designated by communication control apparatus 700a.

Figures 27, 28:
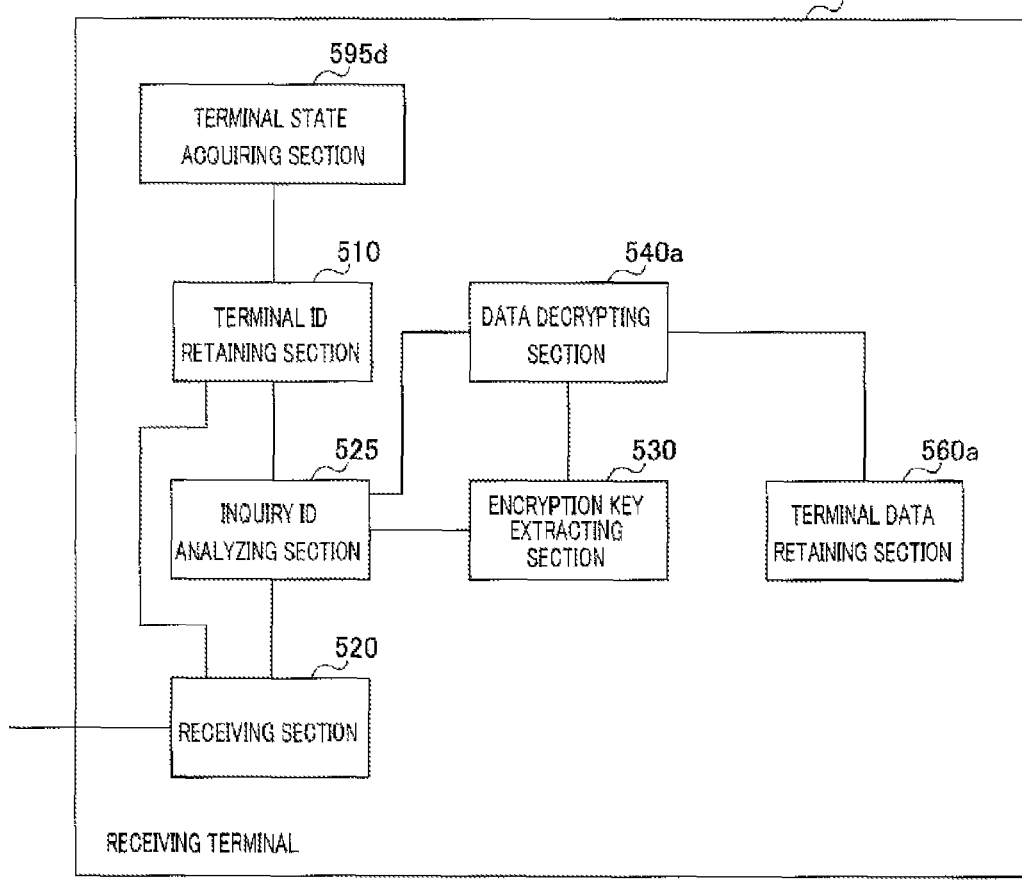
FIG. 27 shows an exemplary ID conversion table in accordance with Embodiment 5 of the present invention.
FIG. 28 is a block diagram showing the configuration of a receiving terminal in accordance with Embodiment 5 of the present invention.

FIG. 27 shows an exemplary structure of an ID conversion table in accordance with this embodiment.

As shown in FIG. 27, ID conversion table 840 has position information 841 and corresponding group ID 842. Note that the position information 841 is not limited to district names, and may be latitude and longitude information or other location information provided that the information acquired by condition acquiring section 480d can uniquely identify a destination terminal.

For example, when communication control apparatus 700a attempts to collect measurement information from sensors in Shinagawa ward, communication control apparatus 700a passes the position information of "Shinagawa ward" and an uplink data transmission command to transmitting terminal 400d. Condition acquiring section 480d passes a group ID of "000 000 010", which corresponds to the position information of "Shinagawa ward", to inquiry ID generating section 420.

Such transmitting terminal 400d can transmit communication data to a group corresponding to the terminal condition.

FIG. 28 is a block diagram showing the configuration of a receiving terminal in accordance with this embodiment of the present invention, which corresponds to FIG. 14 in Embodiment 2. The same functional, units as those in FIG. 14 are given the same numbers and the description thereof is omitted.

In FIG. 28, receiving terminals 500d further includes terminal, state acquiring section 595d. Receiving terminals 500d may have functional units as shown in Embodiments 1-4, but the drawings and description thereof are omitted.

Terminal state acquiring section 595d preliminarily has the same ID conversion table (see FIG. 27) as that of transmitting terminal 400d. Terminal state acquiring section 595d acquires the terminal state (position information in this embodiment) that can be designated as a destination terminal condition at transmitting terminal 400d, for example, on a regular basis. Terminal state acquiring section 595d uses the ID conversion table to convert the acquired terminal state to a group ID and allow terminal ID retaining section 510 to retain it as a terminal ID.

For example, if a user in Shinagawa ward is carrying a receiving terminal 500d with him/her, terminal state acquiring section 595d acquires position information of "Shinagawa ward". Terminal state acquiring section 595d passes a group ID of "000 000 010" corresponding to the position information of "Shinagawa ward" to terminal ID retaining section 510.

If receiving terminal 500d has the terminal condition designated by transmitting terminal 400d, receiving terminal 500d can receive communication data from transmitting terminal 400d.

As described above, the communication system having transmitting terminal 400d and receiving terminals 500d in accordance with this embodiment can designate a destination to which an encryption key and communication data is transmitted based on a terminal condition.

Transmitting terminal 400d may designate a receiving terminal 500d dynamically not as a destination to which communication data is transmitted, but as a terminal on which an uplink data transmission command is executed. Transmitting terminal 400d may designate a transmitting destination of an encryption key just based on a terminal state.

The given bit size and/or bit position correspondence relationship described in Embodiments 1 to Embodiment 5 are not limited to the above-mentioned examples.

The transmitting terminal, receiving terminals, ID assigning apparatus, and key transmitting method in accordance with the present invention may be applicable to various systems other than the above-mentioned sensor system that communicate with a specific large number of apparatuses using encryption keys shared among them. Preferable systems to which the present invention can be applied include, for example, an automatic water meter reader for residential use, a roll-call system at elementary schools, an electricity consumption reader for household electrical appliance, and traffic congestion information distribution system for vehicles running on road.

The specifications, diagrams and summary of Japanese Patent Application No. 2011-093984 filed on Apr. 20, 2011 are incorporated herein by reference.

INDUSTRIAL APPLICABILITY

A transmitting terminal, a receiving terminal, an ID assigning apparatus and a key transmitting method in accordance with the present invention can share encryption keys securely with a limited resource in a system where a specific large number of apparatuses are in communication with each other using the encryption keys shared among them.

REFERENCE SIGNS LIST

100 Communication system
200 Communication network
300 ID assigning apparatus
310, 310c ID managing section
320, 320c Group ID selecting section
330, 330c Terminal ID generating section
340, 340c ID registering section
400, 400a, 400b, 400c, 400d Transmitting terminal
410 Random block generating section
420 Inquiry ID generating section
430, 580a Transmitting section
440a Encryption key generating section
450a, 450b, 570a Data encrypting section
460a, 520 Receiving section
470a Data decrypting section
480d Condition acquiring section
500, 500a, 500b, 500c, 500d Receiving terminal
510 Terminal ID retaining section
525 Inquiry ID analyzing section
530 Encryption key extracting section
540a Data decrypting section
550a Received data recording section
560a Terminal data retaining section
590b Terminal ID confirming section
595d Terminal state acquiring section
700a Communication control apparatus
700c Terminal ID change control apparatus

The invention claimed is:

1. A transmitting terminal apparatus transmitting an encryption key to a receiving terminal apparatus with which the encryption key is to be shared, the transmitting terminal apparatus comprising a processor and a memory, wherein the processor executes instructions stored in a memory and is configured to:
   generate a random block by randomly selecting and concatenating mask value blocks, each of the mask value blocks being consisted of only bits having 0 values or only bits having 1 values;
   generate a random bit sequence as the encryption key:
   encrypt communication data having an error detection code using the encryption key to generate encrypted data:
   generate an inquiry ID using a first bit sequence and the encryption key, the first bit sequence being obtained by XORing a group ID of the receiving terminal apparatus's affiliated group and the random block, the group ID of the receiving terminal apparatus XORing of which with a terminal ID of the receiving terminal apparatus consists of only a bit sequence concatenating the mask value blocks;
   generate a downlink message containing the inquiry ID and the encrypted data: and
   transmit the downlink message containing the inquiry ID and the encrypted data to multiple apparatuses in the receiving terminal apparatus's affiliated group, including the receiving terminal apparatus,
   wherein a number of bits of the encryption key equals a number of blocks into which the first bit sequence is divided;
   each of the bits of the encryption key corresponds to one of the blocks on a one-to-one basis;
   each bit value of the encryption key indicates a bit position in one of the corresponding blocks; and
   the inquiry ID is generated by inverting, in each of the blocks corresponding to the respective bits of the encryption key, a bit value at the bit position indicated by the bit value of the encryption key.

2. The transmitting terminal apparatus according to claim 1, wherein the inquiry ID is generated using a second bit sequence XORing of which with the group ID of any other group does not result in a concatenation of only bit-inverted blocks, the bit-inverted blocks being those in a bit-inverted block pair, the bits of one block and the respective bits of the other block being inverted from each other, and
the inquiry ID is transmitted to apparatuses in the other group.

3. The transmitting terminal apparatus according to claim 1, wherein the processor is further configured to encrypt communication data and data individually specifying receiving terminal apparatuses to which the communication data is transmitted using the encryption key, to generate the encrypted data,
wherein:
a downlink message containing the inquiry ID and the encrypted data is generated and transmitted to the multiple apparatuses.

4. The transmitting terminal apparatus according to claim 1, wherein the processor is further configured to:
receive an uplink message from the receiving terminal apparatus, the uplink message containing encrypted data obtained by encrypting communication data; and
decrypt the encrypted data contained in the uplink message using the encryption key.

5. The transmitting terminal apparatus according to claim 1, wherein the communication data contains a command to change a group ID and terminal IDs of the receiving terminal apparatuses that received the communication data to a new group ID and new terminal IDs, the new terminal IDs XORing of which with the new group ID consists of only the concatenated mask value blocks.

6. The transmitting terminal apparatus according to claim 1, wherein the processor is further configured to acquire a terminal condition of a terminal state of the receiving terminal apparatus and pass a bit sequence indicating the terminal state of the acquired terminal condition as the group ID of the receiving terminal apparatus.

7. A receiving terminal apparatus receiving an encryption key from a transmitting terminal apparatus with which the encryption key is to be shared, the receiving terminal apparatus comprising a processor and a memory,
wherein the processor executes instructions stored in a memory and is configured to:
retain a terminal ID assigned to the receiving terminal apparatus;
receive information containing the receiving terminal apparatus designated as a destination;
receive an inquiry ID from the transmitting terminal apparatus, the inquiry ID being obtained using a first bit sequence and the encryption key in the transmitting terminal apparatus, the first bit sequence being obtained by XORing a group ID of the receiving terminal apparatus's affiliated group and a random block, the random block being generated by randomly selecting and concatenating mask value blocks, each of the mask value blocks being consisted of only bits having 0 values or only bits having 1 values, and the group ID of the receiving terminal apparatus XORing of which with the terminal ID of the receiving terminal apparatus consists of only a bit sequence concatenating the mask value blocks;
receive a downlink message containing the inquiry ID and encrypted data from the transmitting terminal apparatus:
extract the encryption key from a second bit sequence obtained by XORing the received inquiry ID and the terminal ID: and
decrypt the encrypted data contained in the downlink message using the encryption key,
wherein a number of bits of the encryption key equals a number of blocks into which the first bit sequence is divided;
each of the bits of the encryption key corresponds to one of the blocks on a one-to-one basis;
each bit value of the encryption key indicates a bit position in one of the corresponding mask value blocks;
a destination value block group consists of members, each of which is a bit sequence obtained by inverting, in each of the mask value blocks, a bit value at the bit position indicated by the bit value of the encryption key;
the processor determines whether the second bit sequence consists of only the members of the destination value block group, checks positions of an inverted bit for blocks into which the second bit sequence is divided when the second bit sequence consists of only the members, and extracts the encryption key from the checked positions of the inverted bit for blocks.

8. The receiving terminal apparatus according to claim 7, wherein the processor is further configured to:
record communication data being decrypted data,
wherein:
the encryption key is discarded when an error is detected in the communication data.

9. The receiving terminal apparatus according to claim 7, wherein the processor is further configured to:
determine whether the receiving terminal apparatus is designated as a destination of the decrypted data; and
record the decrypted data as received data provided that the receiving terminal apparatus is designated as the destination of the decrypted data,
wherein the received data is not recorded when the destination of the received data is designated in the received data, but the receiving terminal apparatus is not designated as the destination.

10. The receiving terminal apparatus according to claim 7, wherein the processor is further configured to acquire states of the receiving terminal apparatuses and set a third bit sequence indicating the acquired states to the terminal IDs of the receiving terminal apparatuses.

11. The receiving terminal apparatus according to claim 7, wherein the processor is further configured to:
encrypt communication data using the encryption key to generate encrypted data; and
generate and transmit an uplink message containing the encrypted data to the transmitting terminal apparatus.

12. An ID assigning apparatus that assigns a terminal ID to a receiving terminal apparatus with which an encryption key is to be shared with a transmitting terminal apparatus, the receiving terminal apparatus receiving an inquiry ID from the transmitting terminal apparatus, the ID assigning apparatus comprising a processor and a memory, wherein the processor executes instructions stored in a memory and is configured to:
manage assigned terminal IDs;
select a group ID;
generate the terminal ID affiliated to the group ID; and
assign the terminal ID to the receiving terminal apparatus so as to avoid duplication with a preliminarily assigned terminal ID,
wherein
the group ID is a bit sequence XORing of which with the group ID of another group does not result in a concatenation of only bit-inverted blocks, the bit-inverted blocks being those in a bit-inverted block pair, the bits of one block and the respective bits of the other block being inverted from each other, the generated terminal ID is a bit sequence XORing of which with the selected group ID results in inclusion of only mask value blocks, each of the mask value blocks being consisted of only bits having 0 values or only bits having 1, wherein the encryption key is generated as a random bit sequence;

the inquiry ID is generated at the transmitting terminal apparatus using a first bit sequence and the encryption key, the first bit sequence being obtained by XORing the group ID of the receiving terminal apparatus's affiliated group and a random block, the random block being generated by randomly selecting and concatenating the mask value blocks, the group ID of the receiving terminal XORing of which with a terminal ID of the receiving terminal apparatus consists of only a bit sequence concatenating the mask value blocks, wherein a number of bits of the encryption key equals a number of blocks into which the first bit sequence is divided;

each of the bits of the encryption key corresponds to one of the blocks on a one-to-one basis;

each bit value of the encryption key indicates a bit position in the one of the corresponding blocks; and the inquiry ID is generated by inverting, in each of the blocks corresponding to the respective bits of the encryption key, a bit value at the bit position indicated by the bit value of the encryption key; and a downlink message containing the inquiry ID and encrypted data is generated by the transmitting terminal apparatus and transmitted to multiple apparatuses in the receiving terminal apparatus's affiliated group, including the receiving terminal apparatus.

13. A key transmitting method for a transmitting terminal apparatus to transmit an encryption key to a receiving terminal apparatus with which the encryption key is to be shared, the key transmitting method comprising the following steps performed by a processor:

generating a random block by randomly selecting and concatenating mask value blocks, each of the mask value block being consisted of only bits having 0 values or only bits having 1 values;

generating a random bit sequence as the encryption key;

encrypting communication data having an error detection code using the encryption key to generate encrypted data;

generating an inquiry ID using a first bit sequence and the encryption key, the first bit sequence being obtained by XORing a group ID of the receiving terminal apparatus's affiliated group and the random block, the group ID of the receiving terminal apparatus XORing of which with a terminal ID of the receiving terminal apparatus consists of only a bit sequence concatenating the mask value blocks;

generating a downlink message containing the inquiry ID and the encrypted data; and transmitting the downlink message containing the inquiry ID and the encrypted data to multiple receiving terminal apparatuses in the receiving terminal apparatus's affiliated group, including the receiving terminal apparatus, wherein a number of bits of the encryption key equals a number of blocks into which the first bit sequence is divided;

each of the bits of the encryption key corresponds to one of the blocks on a one-to-one basis;

each bit value of the encryption key indicates a bit position in one of the corresponding blocks; and the inquiry ID is generated by inverting, in each of the blocks corresponding to the respective bits of the encryption key, a bit value at the bit position indicated by the bit value of the encryption key.

* * * * *